United States Patent
Chen

(10) Patent No.: US 10,866,620 B2
(45) Date of Patent: Dec. 15, 2020

(54) MOBILE TERMINAL AND CAMERA ASSEMBLY

(71) Applicant: GUANGDONG OPPO MOBILE TELECOMMUNICATIONS CORP., LTD., Guangdong (CN)

(72) Inventor: Jia Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/280,440

(22) Filed: Feb. 20, 2019

(65) Prior Publication Data

US 2019/0339745 A1    Nov. 7, 2019

(30) Foreign Application Priority Data

May 4, 2018 (CN) ........................ 2018 1 0421079
May 4, 2018 (CN) ..................... 2018 2 0668134 U

(51) Int. Cl.
*G06F 1/16* (2006.01)

(52) U.S. Cl.
CPC .......... *G06F 1/1686* (2013.01); *G06F 1/1616* (2013.01); *G06F 1/1681* (2013.01)

(58) Field of Classification Search
CPC ..... G05F 1/1686; G06F 1/1616; G06F 1/1681
See application file for complete search history.

(56) References Cited

U.S. PATENT DOCUMENTS

| | | | | |
|---|---|---|---|---|
| 5,414,444 A | * | 5/1995 | Britz | H04M 1/0245 345/156 |
| 6,118,653 A | * | 9/2000 | Kim | G06F 1/1616 361/679.23 |
| 6,587,151 B1 | * | 7/2003 | Cipolla | G06F 1/1607 348/207.1 |
| 6,646,672 B2 | * | 11/2003 | Feierbach | G06F 1/1616 348/14.01 |
| 6,996,424 B2 | * | 2/2006 | Ijas | G06F 1/1616 455/575.1 |

(Continued)

FOREIGN PATENT DOCUMENTS

| | | |
|---|---|---|
| CN | 1359221 A | 7/2002 |
| CN | 101086611 A | 12/2007 |

(Continued)

OTHER PUBLICATIONS

International search report,PCT/CN2019/075409, dated May 17, 2019.

(Continued)

*Primary Examiner* — Abhishek M Rathod
*Assistant Examiner* — Keith DePew

(57) ABSTRACT

A mobile terminal is disclosed. When the support assembly of the mobile terminal is unfolded, an entire display screen can perform displaying, so that the mobile terminal can realize large-screen displaying. When the support assembly is folded, the first housing and the second housing are stacked, so that the length of the support assembly is only about a half of the support assembly when it is unfolded, making the mobile terminal convenient to carry. Therefore, the mobile terminal has a large displaying area and is convenient to carry.

18 Claims, 16 Drawing Sheets

(56) References Cited

U.S. PATENT DOCUMENTS

| | | | |
|---|---|---|---|
| 7,046,287 B2* | 5/2006 | Nishino | H04M 1/0216 348/333.06 |
| 7,126,816 B2* | 10/2006 | Krah | G06F 1/1616 361/679.55 |
| 7,202,906 B2* | 4/2007 | Ijas | G06F 1/1616 348/375 |
| 7,425,100 B2* | 9/2008 | Castaneda | H04M 1/0264 348/E5.03 |
| 7,453,688 B2* | 11/2008 | Wu | G06F 1/1616 361/679.55 |
| 7,570,485 B2* | 8/2009 | Krah | G06F 1/1616 345/157 |
| 7,800,648 B2* | 9/2010 | Lu | H04N 5/2252 348/207.1 |
| 7,973,856 B2* | 7/2011 | Lee | H04N 5/2251 348/375 |
| 8,035,481 B2* | 10/2011 | Krah | G06F 1/1616 340/7.58 |
| 9,195,265 B1* | 11/2015 | Jackson | G06F 1/1607 |
| 9,195,275 B2* | 11/2015 | Liu | G06F 1/1684 |
| 10,306,033 B1* | 5/2019 | Cheng | H04M 1/0264 |
| 2002/0016191 A1* | 2/2002 | Ijas | G06F 1/1641 455/575.3 |
| 2002/0044425 A1* | 4/2002 | Ijas | H04M 1/0214 361/724 |
| 2002/0077145 A1* | 6/2002 | Kamiya | H04M 1/0264 455/556.1 |
| 2002/0080231 A1* | 6/2002 | Feierbach | G06F 1/1686 348/14.02 |
| 2004/0012701 A1* | 1/2004 | Nagai | H04N 7/142 348/333.12 |
| 2005/0168924 A1* | 8/2005 | Wu | G06F 1/1679 361/679.58 |
| 2005/0195322 A1* | 9/2005 | Park | H04M 1/0264 348/373 |
| 2005/0201047 A1* | 9/2005 | Krah | G06F 1/1616 361/679.55 |
| 2005/0263600 A1 | 12/2005 | Yang et al. | |
| 2006/0268505 A1* | 11/2006 | Krah | G06F 1/1616 361/679.41 |
| 2007/0216774 A1* | 9/2007 | Shin | G02B 7/10 348/207.99 |
| 2008/0180398 A1* | 7/2008 | Kim | G06F 1/1666 345/169 |
| 2008/0194290 A1* | 8/2008 | Lebert | G01D 5/145 455/556.1 |
| 2009/0231484 A1* | 9/2009 | Lee | G06F 1/1686 348/373 |
| 2009/0268401 A1* | 10/2009 | Krah | G06F 1/1686 361/679.55 |
| 2009/0322967 A1* | 12/2009 | Liou | G06F 1/1624 348/744 |
| 2013/0170120 A1* | 7/2013 | Richardson | H04M 1/03 361/679.3 |
| 2014/0218857 A1* | 8/2014 | Liu | G06F 1/1616 361/679.27 |
| 2017/0123463 A1* | 5/2017 | Douglas | H04N 5/2254 |
| 2017/0353633 A1 | 12/2017 | Eromäki | |
| 2018/0077810 A1* | 3/2018 | Moon | H05K 5/0017 |
| 2018/0095504 A1* | 4/2018 | Knepper | G06F 1/1618 |
| 2018/0292866 A1* | 10/2018 | Tucker | G06F 1/1686 |
| 2019/0138062 A1* | 5/2019 | Zeng | H04N 5/2253 |
| 2019/0163242 A1* | 5/2019 | Zeng | H04N 5/2252 |
| 2019/0258300 A1* | 8/2019 | Gerardi | G06F 1/1632 |
| 2019/0297174 A1* | 9/2019 | Leung | G06F 1/1686 |
| 2019/0342432 A1* | 11/2019 | Chen | H04M 1/0268 |
| 2019/0342435 A1* | 11/2019 | Chen | G06F 1/1686 |

FOREIGN PATENT DOCUMENTS

| | | |
|---|---|---|
| CN | 106817450 A | 6/2017 |
| CN | 107241466 A | 10/2017 |
| CN | 107528940 A | 12/2017 |
| CN | 206894705 U | 1/2018 |
| CN | 208128322 U | 11/2018 |
| DE | 60119451 T2 | 11/2006 |
| EP | 1635313 A2 | 3/2006 |
| EP | 2720140 A1 | 4/2014 |
| WO | WO2014122512 A1 | 8/2014 |

OTHER PUBLICATIONS

European search report, EP19158263.4 dated Sep. 20, 2019 (7 pages).

Indian First Examination Report, Indian Application No. 201914013723, dated Sep. 25, 2020 (5 pages).

* cited by examiner

MOBILE TERMINAL AND CAMERA ASSEMBLY

CROSS REFERENCE TO RELATED APPLICATION

This application claims foreign priorities of Chinese Patent Application No. 201820668134.4, filed on May 4, 2018 and Chinese Patent Application No. 201810421079.3, filed on May 4, 2018, the entire contents of which are hereby incorporated by reference in their entireties.

TECHNICAL FIELD

The described embodiments relate to mechanical structure communication technology, and in particular relates to a mobile terminal and camera assembly.

BACKGROUND

Nowadays, electronic devices with display screens, such as display electronic products like mobile phones, tablet computers, and the like, generally include a display screen with a size matching the hardware size. To provide the display with a larger displaying area, the hardware accordingly needs to get larger, which will greatly reduce the portability of the product.

SUMMARY

The present disclosure provides a mobile terminal with a large displaying area and being convenient to carry to solve technical problems.

The present disclosure provides a mobile terminal, including a support assembly, a main display screen and a movable seat, the support assembly including a first housing, a second housing and a bending member, wherein the bending member may be connected between the first housing and the second housing, and the bending member may get unfolded or bent to unfold or fold the support assembly; the first housing may include a first inner face, a first outer face, and a first lateral face, the first outer face carrying the main display screen, the first inner face disposed opposite to the first outer face, the first lateral face connected between the first inner face and the first outer face, and the first housing defines a recessed region concaving in a direction from the first inner face to the first outer face, the recessed region extending to the first lateral face; the second housing may include a second inner face, a second outer face, and a second lateral face, the second outer face carrying the main display screen, the second inner face disposed opposite to the second outer face, the second lateral face connected between the second inner face and the second outer face, and the second housing may define a receiving region penetrating through the second inner face to the second outer face and extending to the second lateral face; when the support assembly may be folded, the second inner face may be disposed facing to the first inner face, the receiving region and the recessed region may be merged to form a moving space, and the movable seat may be provided with a first camera, the movable seat may be rotatably connected to the first housing to bring the first camera to rotate into or out of the moving space.

The present disclosure provides a mobile terminal, including a first display part, a second display part, and a fold joint, wherein the fold joint may be connected between the first display part and the second display part, the fold joint may be configured to get unfolded or folded to unfold or fold the first display part and the second display part; the first display part may include a first folded face connected to the fold joint, a first outer face connected to the fold joint, a first lateral face connected to the first folded face and the first outer face, and away from the fold joint; wherein the first outer face may be configured to display and opposite to the first folded face, a mounting slot may be defined at the first folded face and may extend to the first lateral face; the second display part may include a second folded face connected to the fold joint, a second outer face connected to the fold joint, a second lateral face connected to the second folded face and the second outer face, and away from the fold joint; wherein the second outer face may be configured to display and opposite to the second folded face, an escape hole may be defined by the second display part, may penetrate the second folded face and the second outer face, and may extend to the second lateral face; when the fold joint is folded, the first folded face may be faced to the second folded face, the mounting slot and the escape hole may communicate with each other to form a receiving space, a camera may be rotatably connected to a wall of the mounting slot to rotate into or out of the receiving space.

The present disclosure provides a camera assembly mobile terminal, including a first portion, a second portion, and a fold joint, wherein the fold joint may be connected between the first portion and the second portion, the fold joint may be configured to get unfolded or folded to unfold or fold the first portion and the second portion; the first portion may include a first folded face connected to the fold joint, a first outer face connected to the fold joint, and opposite to the first folded face, a first lateral face connected to the first folded face and the first outer face, and away from the fold joint; wherein a mounting slot may be defined at the first folded face and may extend to the first lateral face; the second portion may include a second folded face connected to the fold joint, a second outer face connected to the fold joint, and opposite to the second folded face, a second lateral face connected to the second folded face and the second outer face, and away from the fold joint; wherein an escape hole may be defined by the second portion, may penetrate the second folded face and the second outer face, and may extend to the second lateral face; when the fold joint is folded, the first folded face may be faced to the second folded face, the mounting slot and the escape hole communicate with each other to form a receiving space, a camera may be rotatably connected to a wall of the mounting slot to rotate into or out of the receiving space.

BRIEF DESCRIPTION OF THE DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art might acquire other drawings based on these drawings, without paying any creative efforts.

DETAILED DESCRIPTION

Figure 1:
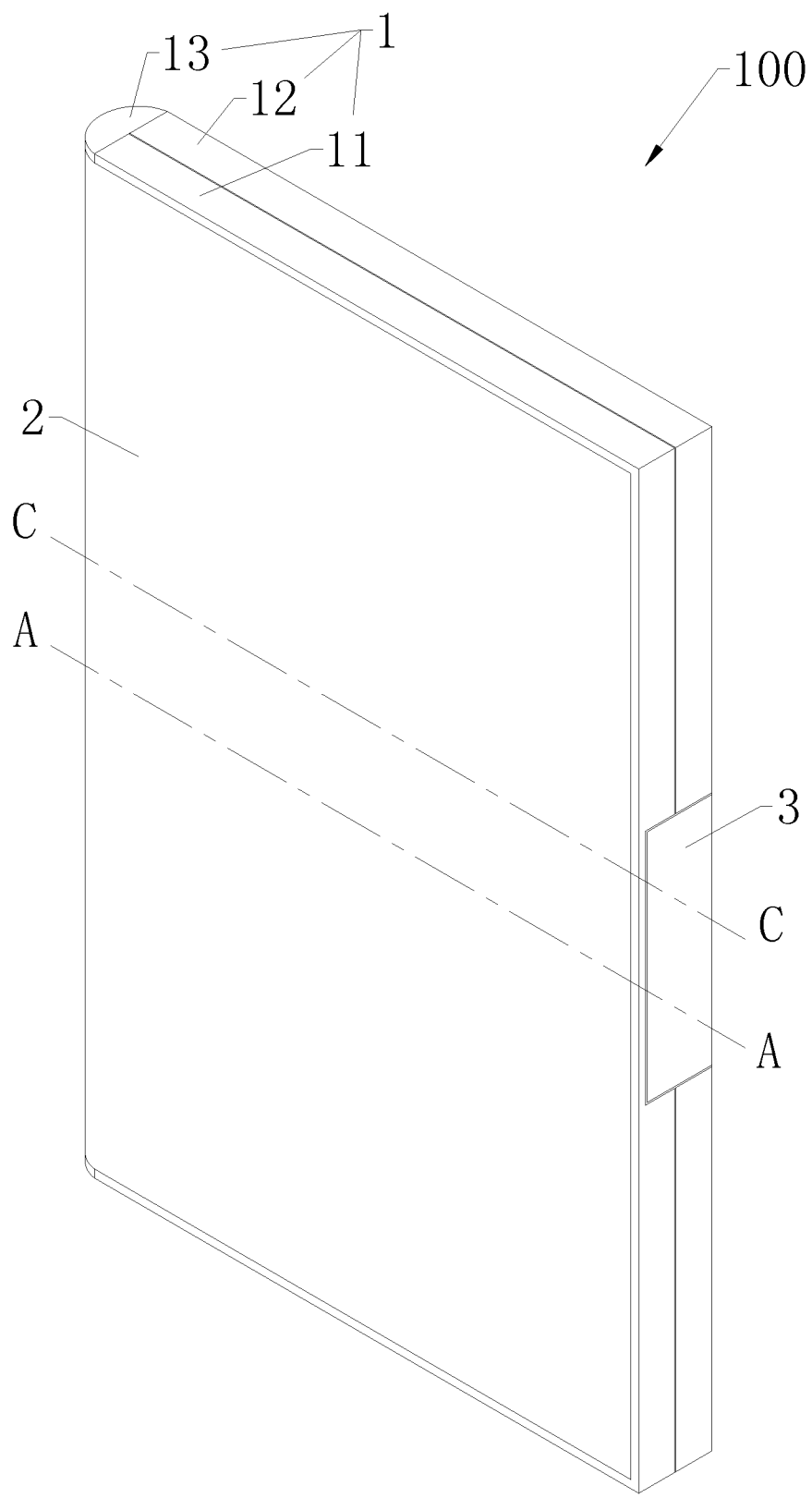
FIG. 1 is a schematic structural diagram illustrating a mobile terminal when folded, provided by an embodiment of the present disclosure.

Herein below, technical solutions of the embodiments of the present disclosure will be described with reference to the attached drawings illustrating the embodiments of the present disclosure. Obviously, the embodiments described herein are only a part of but not all of the embodiments of the present disclosure. All other embodiments that can be obtained by those of ordinary skill in the art from the embodiments of the present disclosure without making creative efforts shall fall within the scope of the present disclosure.

In the description of the present disclosure, it is to be understood that terms such as "up", "down", "front", "rear", "left", "right", "top", "bottom", "inner", "outer", "circumferential", and the like, refer to the orientations and locational relations illustrated in the accompanying drawings. Thus, these terms used here are only for describing the present disclosure and for describing in a simple manner, and are not intended to indicate or imply that the device or the elements are disposed to locate at the specific directions or are structured and performed in the specific directions, which could not to be understood as limiting the present disclosure.

In the present disclosure, unless specified or limited, otherwise, terms "mounted", "connected", "coupled", "arranged", and the like are used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

In the specification of the present disclosure, it is to be understood that term of "a plurality of" means two or more than two, unless specified otherwise. If the present disclosure includes term of "procedure", which not merely refers to an independent procedure, and in the case when it cannot be definitively separated from other procedures, as long as the expected function of the procedure has been achieved, it should be included by the term. Besides, the numeric range with the term of "to" means a range in which the value before "to" and the value after "to" are separately referred as the minimum and the maximum. In the drawings, similar structures and the same units are indicated with the same reference numbers.

In addition, a communication terminal configured to communicate through a wireless interface may be referred to as a "wireless communication terminal", a "wireless terminal", or a "mobile terminal." The "communication terminal" used herein (or simply "terminal") may include, but is not limited to, a device configured to be coupled via a wired connection (for example, via a public switched telephone network (PSTN), a digital subscriber line (DSL), a digital cable, a direct cable connection, and/or another data connection/network) and/or a device configured to receive/send a communication signal via a wireless interface (such as a cellular network, a wireless local area network (WLAN), a digital television network such as a DVB-H network, a satellite network, an AM-FM broadcast transmitter, and/or another communication terminal). Examples of mobile terminal include, but are not limited to, a satellite or cell phone; a personal communication system (PCS) terminal that can combine a cellular radiotelephone, data processing, facsimile, and data communications capabilities; may include a radiotelephone, a pager, an Internet/Intranet access, a Web browser, an electronic organizer, a calendar, and/or a personal digital assistant (PDA) equipped with a global positioning System (GPS) receiver, and a common laptop and/or palm type receiver or some other electronic devices including a transmitter-receiver radiotelephone.

A mobile terminal according to an embodiment of the present disclosure may include a support assembly, a main display screen and a movable seat. The support assembly may include a first housing, a second housing and a bending member. The bending member may be connected between the first housing and the second housing. The bending member gets unfolded or bent to unfold or fold the support assembly. The first housing may include a first inner face, a first outer face, and a first lateral face. The first outer face can carry the main display screen. The first inner face may be disposed opposite to the first outer face. The first lateral face may be connected between the first inner face and the first outer face. The first housing can define a recessed region concaving in a direction from the first inner face to the first outer face. The recessed region may extend to the first lateral face. The second housing may include a second inner face, a second outer face, and a second lateral face. The second outer face can carry the main display screen. The second inner face may be disposed opposite to the second outer face. The second lateral face may be connected between the second inner face and the second outer face. The second housing may define a receiving region penetrating through the second inner face to the second outer face and extending to the second lateral face. When the support assembly is folded, the second inner face can be disposed facing to the first inner face, the receiving region and the recessed region may be merged to form a moving space. The movable seat can be provided with a first camera. The movable seat may be rotatably connected to the first housing to bring the first camera to rotate into or out of the moving space.

In another embodiment, an orientation of an image-capturing face of the first camera may coincide with an orientation of the second outer face, when the movable seat rotates into the moving space.

In another embodiment, the movable seat may include a first outer wall face. An orientation of the first outer wall face may coincide with the orientation of the second outer face, when the movable seat rotates into the moving space. The first outer wall face may define a through hole, with the image-capturing face of the first camera facing towards the through hole.

In further another embodiment, the mobile terminal may include a secondary display screen. The secondary display screen may be disposed on the first outer wall face. The secondary display screen may include a light-transmitting region. The light-transmitting region may face towards the through hole.

In still further another embodiment, the light-transmitting region may be hollowed-out.

In another embodiment, the light-transmitting region may define a plurality of light-transmitting holes spaced apart from each other.

In another embodiment, the secondary display screen may include a cover plate and a display module. The cover plate and the display module are stacked. A portion of the display module may be corresponding to the light-transmitting region. The portion of the display module may be hollowed-out.

In another embodiment, the secondary display screen may include a cover plate and a display module. The cover plate and the display module may be stacked. The display module may define a plurality of hollow holes. The plurality of hollow holes may be spaced apart from each other in a region corresponding to the light-transmitting region.

In further another embodiment, the secondary display screen may include a cover plate, a display layer and a light-shielding layer. The cover plate, the display layer and the light-shielding layer may be stacked. The display layer may be a transparent display layer. A portion of the light-shielding layer may be corresponding to the light-transmitting region. The portion of the light-shielding layer may be hollowed-out.

In further another embodiment, the secondary display screen may include a cover plate, a display layer and a light-shielding layer. The cover plate, the display layer and the light-shielding layer may be stacked. The display layer may be a transparent display layer. The light-shielding layer may define a plurality of a penetration holes spaced apart from each other in a region corresponding to the light-transmitting region.

In still further another embodiment, the main display screen may include a display part. The display part may be stacked on the second outer face. When the movable seat rotates into the moving space, the secondary display screen may be flush with the display part.

In another embodiment, the main display screen may include a display part. The display part may be stacked on the second outer face. The first outer wall face may be flush with a face of the display part away from the second outer face, when the movable seat rotates into the moving space.

In another embodiment, the movable seat further may include a second outer wall face. The second outer wall face may be connected to the first outer wall face. The second outer wall face may be located between the first outer face and the second outer face and located opposite to the support assembly, when the movable seat rotates into the moving space. An orientation of the second outer wall face may coincide with the orientation of the first outer face, when the movable seat rotates out of the moving space. The mobile terminal may further include an additional display screen disposed on the second outer wall face.

In another embodiment, the movable seat may further include a third outer wall face. The third outer wall face may be connected to the first outer wall face and disposed opposite to the second outer wall face. The third outer wall face may be located between the first outer face and the second outer face and faced towards the support assembly, when the movable seat rotates into the moving space. An orientation of the third outer wall face may coincide with the orientation of the second outer face, when the movable seat rotates out of the moving space. The movable seat may further be provided with a second camera. An orientation of an image-capturing face of the second camera may coincide with the orientation of the third outer wall face. The movable seat may further be provided with a flash lamp. An orientation of a light-emitting face of the flash lamp may coincide with the orientation of the third outer wall face.

In another embodiment, the first housing may further include a third lateral face and a fourth lateral face. The third lateral face and the fourth lateral face may both be connected between the first inner face and the first outer face. The third lateral face and the fourth lateral face may be disposed opposite to each other and the third lateral face m connected to one side of the first lateral face. The fourth lateral face may be connected to an opposite side of the first lateral face. The recessed region may penetrate from the third lateral face to the fourth lateral face. The movable seat may further be provided with an earpiece. The movable seat may include a fourth outer wall face and a fifth outer wall face disposed opposite to each other. An orientation of the fourth outer wall face may coincide with an orientation of third lateral face. An orientation of the fifth outer wall face may coincide with an orientation of the fourth lateral face. At least one of the fourth outer wall face and the fifth outer wall face may define a sound hole.

In another embodiment, a projection of the receiving region on the first outer face may cover a projection of the recessed region on the first outer face, when the support assembly is folded.

In another embodiment, the main display screen may be a flexible display screen. The first outer face, an outer face of the bending member, and the second outer face may collectively carry the main display screen.

In further another embodiment, the main display screen may include a first sub-display screen laid on the first outer face and a second sub-display screen laid on the second outer face.

A mobile terminal according to an embodiment of the present disclosure may include a first display part, a second display part, and a fold joint. The fold joint may be connected between the first display part and the second display part. The fold joint may be configured to get unfolded or folded to unfold or fold the first display part and the second display part. The first display part may include a first folded face, a first outer face, and a first lateral face. The first folded face may be connected to the fold joint. The first outer face may be connected to the fold joint. The first lateral face may be connected to the first folded face and the first outer face. The first lateral face may be away from the fold joint. The first outer face may be configured to display. The first outer face may be opposite to the first folded face. The mounting slot may be defined at the first folded face and may extend to the first lateral face. The second display part may include a second folded face, a second outer face, and a second lateral face. The second folded face may be connected to the fold joint. The second outer face may be connected to the fold joint. The second lateral face may be connected to the second folded face and the second outer face, and away from the fold joint. The second outer face may be configured to display. The second outer face may be opposite to the second folded face. The escape hole may be defined by the second display part. The escape hole may penetrate the second folded face and the second outer face, and may extend to the second lateral face. When the fold joint is folded, the first folded face may be faced to the second folded face. The mounting slot and the escape hole may communicate with each other to form a receiving space. A camera may be rotatably connected to a wall of the mounting slot to rotate into or out of the receiving space.

A camera assembly according to an embodiment of the present disclosure may include a first portion, a second portion, and a fold joint. The fold joint may be connected between the first portion and the second portion. The fold joint may be configured to get unfolded or folded to unfold or fold the first portion and the second portion. The first portion may include a first folded face, a first outer face, and a first lateral face. The first folded face may be connected to the fold joint. The first outer face may be connected to the fold joint. The first lateral face may be connected to the first folded face and the first outer face. The first lateral face may be away from the fold joint. The first outer face may be opposite to the first folded face. The mounting slot may be defined at the first folded face and may extend to the first lateral face. The second portion may include a second folded face, a second outer face, and a second lateral face. The second folded face may be connected to the fold joint. The second outer face may be connected to the fold joint and opposite to the second folded face. The second lateral face may be connected to the second folded face and the second outer face, and away from the fold joint. The escape hole may be defined by the second portion. The escape hole may penetrate the second folded face and the second outer face, and may extend to the second lateral face. When the fold joint is folded, the first folded face may be faced to the second folded face. The mounting slot and the escape hole may communicate with each other to form a receiving space. A camera may be rotatably connected to a wall of the mounting slot to rotate into or out of the receiving space.

Figure 2:
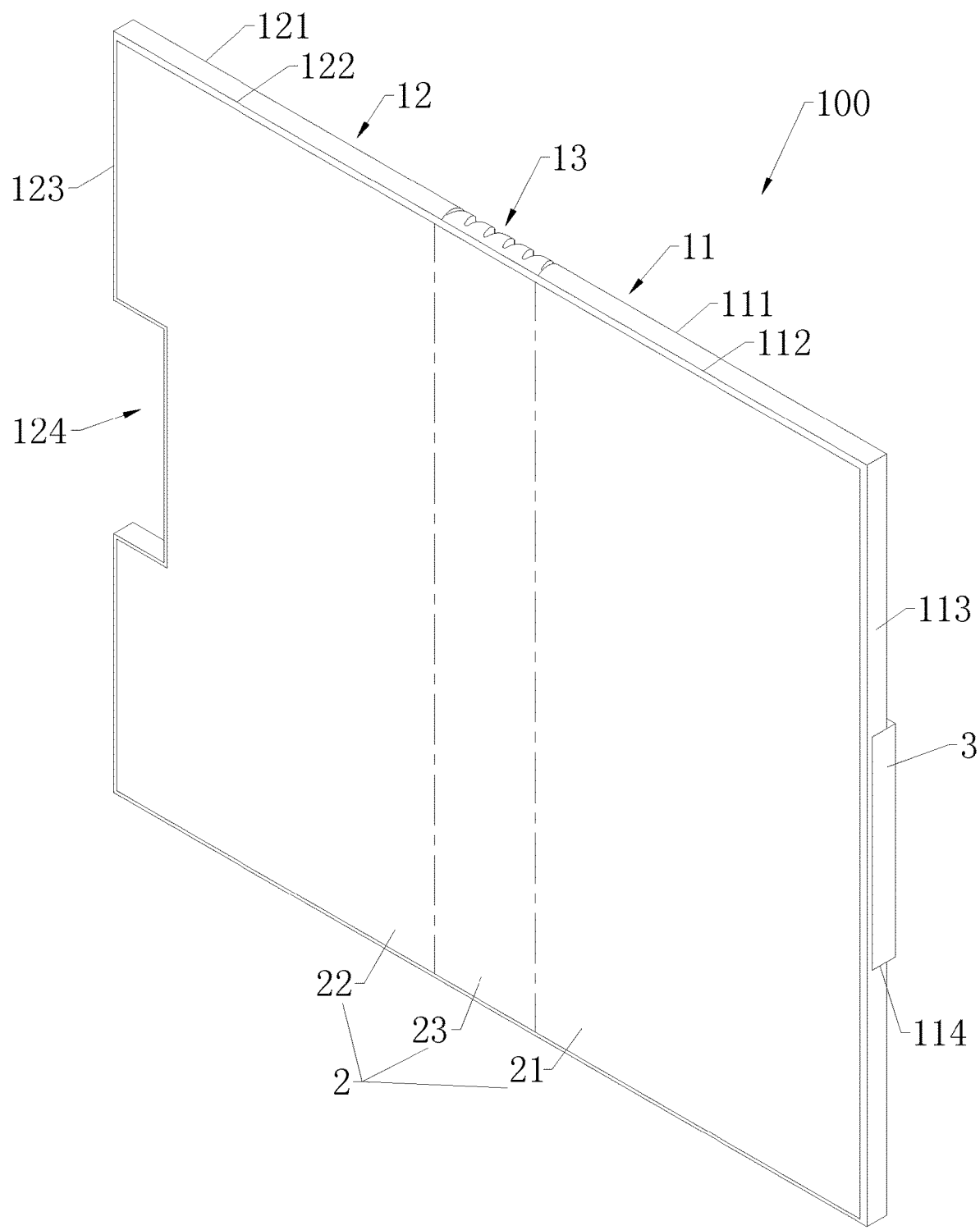
FIG. 2 is a schematic structural diagram illustrating the mobile terminal shown in FIG. 1 when unfolded.

Referring to FIG. 1 and FIG. 2, an embodiment of the present disclosure provides a mobile terminal 100. The mobile terminal 100 may include a support assembly 1, a main display screen 2, and a movable seat 3. The main display screen 2 may be fixed to the support assembly 1. The support assembly 1 may include a first housing 11, a second housing 12, and a bending member 13. The bending member 13 may be connected between the first housing 11 and the second housing 12. The bending member 13 can be unfolded or bent to unfold or fold the support assembly 1. Herein, the bending member 13 can include various implementations, such as an elastic plate structure, a hinge structure, a shaft connection structure, and the like.

In the present disclosure, when the support assembly 1 is in an unfolded state, the first housing 11 and the second housing 12 may form an angle of 120° to 180°. As shown in FIG. 2, the present disclosure is described, taking the case as an example that an angle of 180° is formed between the first housing 11 and the second housing 12 when the support assembly 1 is unfolded. When the support assembly 1 is in a folded state, an angle of 0° to 15° may be formed between the first housing 11 and the second housing 12. As shown in FIG. 1, the present disclosure is described, taking the case as an example that an angle of 0° between the first housing 11 and the second housing 12 is formed, when the support assembly 1 is folded.

Figure 3:
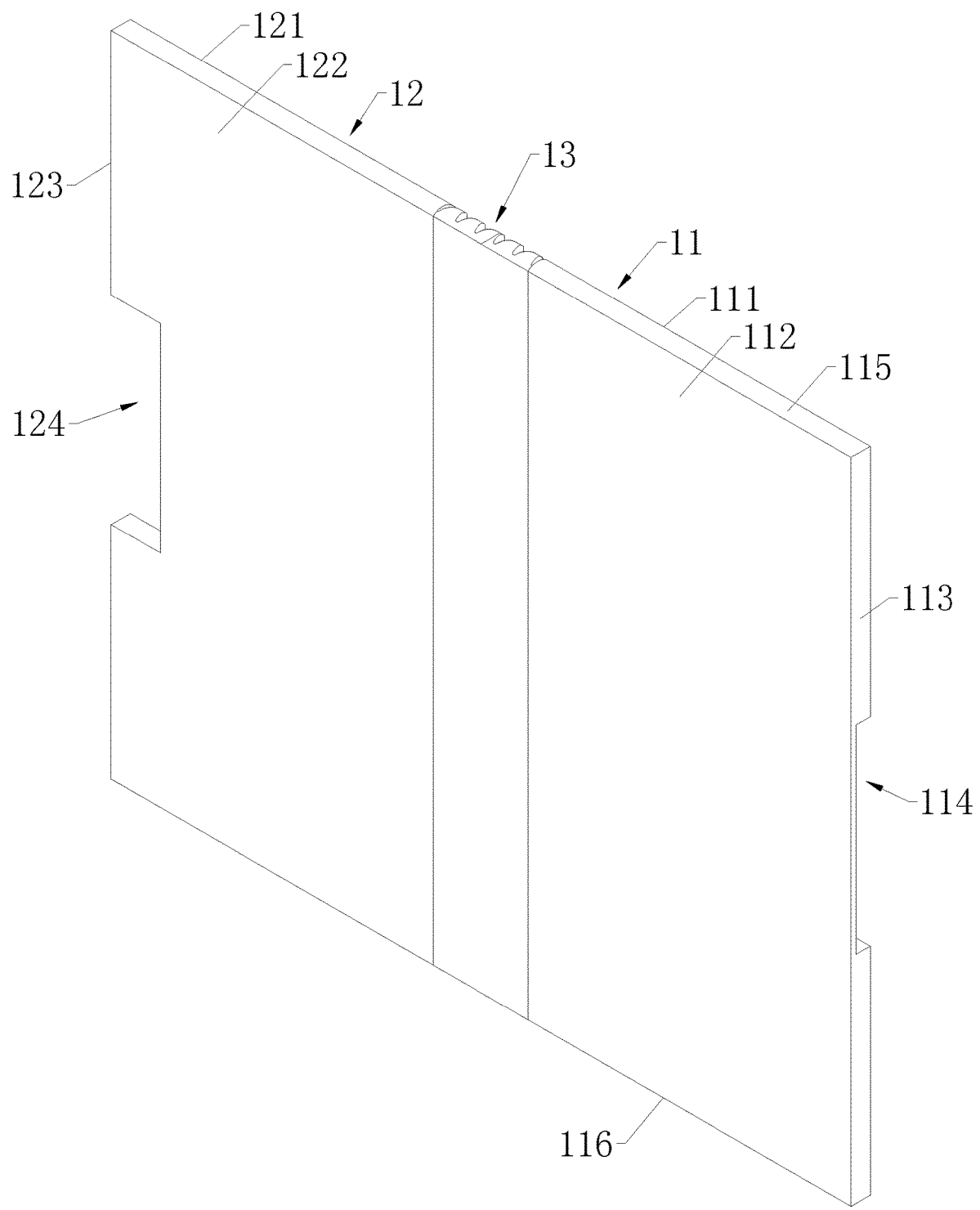
FIG. 3 is a schematic structural diagram illustrating a support assembly of the mobile terminal shown in FIG. 1 when unfolded.

Referring to FIG. 2 and FIG. 3, the first housing 11 may include a first inner face 111, a first outer face 112, and a first lateral face 113. The first outer face 112 can carry the main display screen 2. The first inner face 111 may be disposed opposite to the first outer face 112. The first lateral face 113 may be connected between the first inner face 111 and the first outer face 112. The first housing 11 may define a recessed region 114. The recessed region 114 can concave from the first inner face 11*l* to the first outer face 112, and the recessed region 114 can extend to the first lateral face 113.

Referring to FIG. 2 and FIG. 3, the second housing 12 may include a second inner face 121, a second outer face 122, and a second lateral face 123. The second outer face 122 can carry the main display screen 2. The second inner face 121 may be disposed opposite to the second outer face 122. The second lateral face 123 may be connected between the second inner face 121 and the second outer face 122. An orientation of the second lateral face 123 may coincide with the orientation of the first lateral face 113. The second housing 12 may define a receiving region 124. The receiving region 124 can penetrate through the second inner face 121 to the second outer face 122 and extend to the second lateral face 123.

Figure 4:
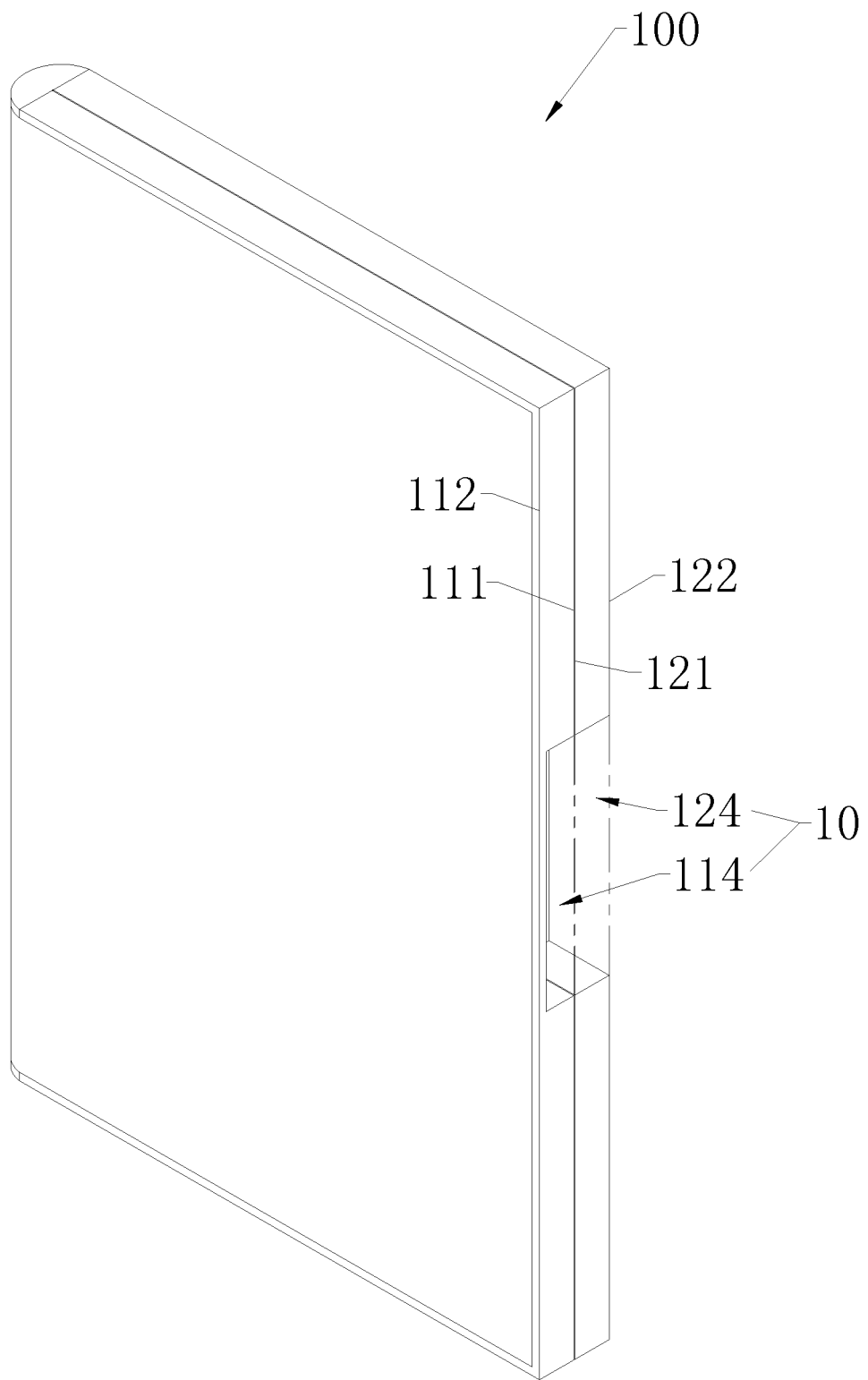
FIG. 4 is a schematic structural diagram illustrating a support assembly of the mobile terminal shown in FIG. 1 when folded.
Figure 5:
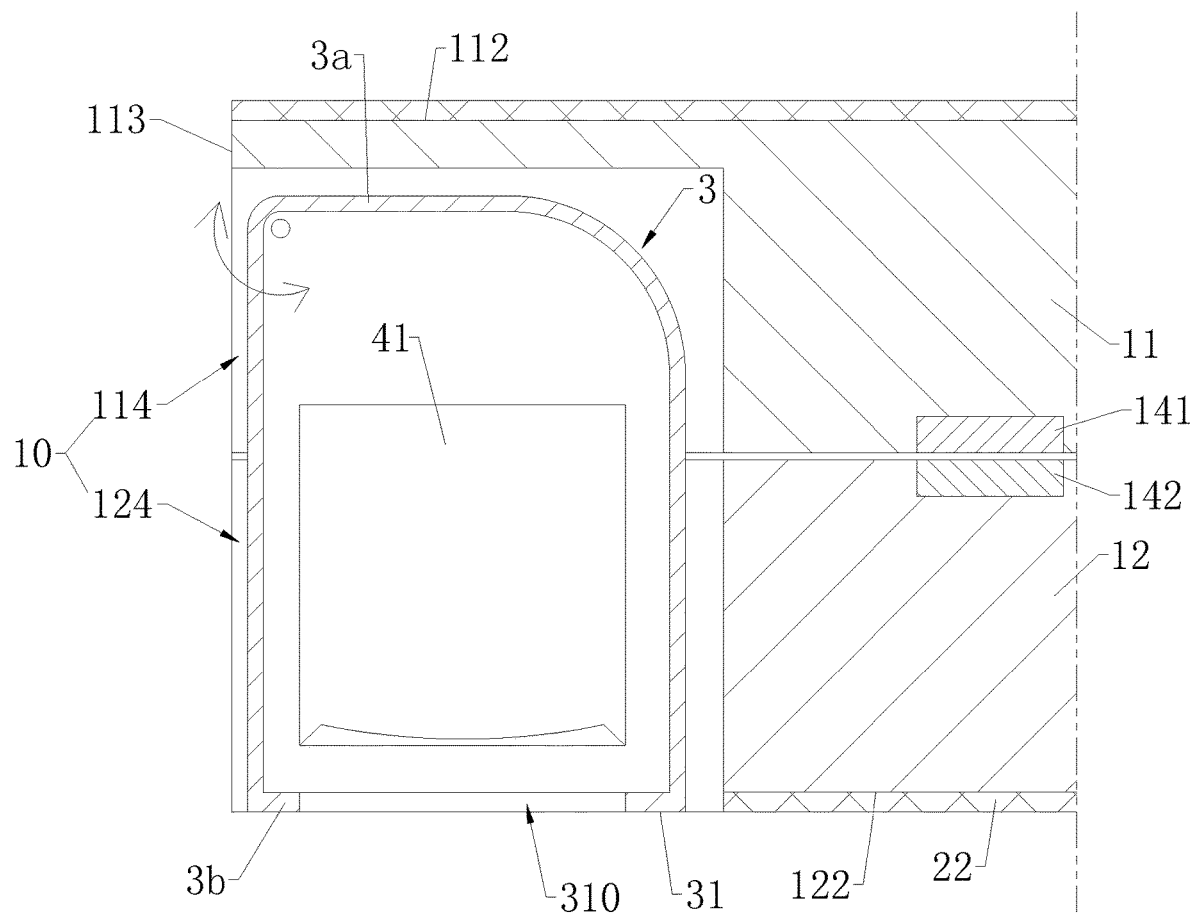
FIG. 5 is a schematic structural diagram illustrating a structure of the mobile terminal shown in FIG. 1 along the line A-A in an embodiment.

Referring to FIG. 1, FIG. 4 and FIG. 5, when the support assembly 1 is folded, the second inner face 121 may face towards the first inner face 111, and the receiving region 124 and the recessed region 114 can merge into a moving space 10. In this case, the first outer face 112 may be disposed opposite to the second outer face 122. A first camera 41 may be disposed on the movable seat 3, and the movable seat 3 can be rotatably connected to the first housing 11, to bring the first camera 41 to rotate into or out of the moving space 10.

In the present embodiment, when the support assembly 1 is unfolded, the entire main display screen 2 can be used for displaying, so that the mobile terminal 100 can realize large screen displaying. When the support assembly 1 is folded, the first housing 11 and the second housing 12 can be stacked, such that the length of the support assembly 1 can be only about a half of that when it is unfolded, and the mobile terminal 100 is convenient to carry. Thus the mobile terminal 100 can include a large displaying area and get convenient to carry.

When the support assembly 1 is folded, the recessed region 114 and the receiving region 124 can merge into the moving space 10, and the receiving region 124 can penetrate through the second inner face 121 to the second outer face 122, and thus on a thickness space of the mobile terminal 100, a size of the receiving region 124 may be large, and the moving space 10 as a whole can also have a large size. The movable seat 3 may well utilize the thickness space of the mobile terminal 100, so that the overall thickness of the mobile terminal 100 can be thin, which may contribute to realizing a thin thickness of the mobile terminal 100. On the other hand, since the movable seat 3 can well utilize the thickness space of the mobile terminal 100, the movable seat 3 can have a large thickness, thereby accommodating more thick devices, such as a camera, etc., so that more functional devices can be arranged in the movable seat 3 to provide the mobile terminal 100 with more functions. Furthermore, since the receiving region 124 can penetrate through the second inner face 121 to the second outer face 122, that is, the receiving region 124 can penetrate the second housing 12. Since the movable seat 3 can be rotatably connected to the first housing 11, the movable seat 3 can rotate by utilizing a space outside the mobile terminal 100 and near the receiving region 124, without a need of saving more rotation space in the mobile terminal 100, so that the movable seat 3 can be configured with a larger size to accommodate more functional devices to meet the user's multi-functional interaction requirements.

In the present disclosure, referring to FIG. 2, the main display screen 2 may include a first display region 21, a display part 22 (also called second display region 22), and a third display region 23. The first display region 21 may stack on the first outer face 112 of the first housing 11. The second display region 22 may stack on the second outer face 122 of the second housing 12. The third display region 23 can be connected between the first display region 21 and the second display region 22. The third display region 23 may stack on the bending member 13. When the support assembly 1 is unfolded or folded, the user can flexibly select any one or more of the first display region 21, the second display region 22, and the third display region 23 for displaying, to meet display requirements.

When the support assembly 1 is folded, the user may select a portion of the main display screen 2 laid on the first outer face 112 for displaying, or the portion of the main display screen 2 laid on the second outer face 122 may be selected for displaying, so that a interaction mode of the mobile terminal 100 can get more diversified, thus providing better user experiences.

In the present disclosure, the orientation of one face coinciding with the orientation of another face, means that an angle between 1350 and 225° can be formed between the two faces, and embodiments of the present disclosure are described with an example of forming an angle of 180° between the two faces, that is, the case in which two faces are parallel.

It can be understood that, in the present disclosure, when the support assembly 1 is unfolded, the recessed region 114 can be separated from the receiving region 124, without forming the moving space 10. Since the movable seat 3 can be rotatably connected to the first housing 11, when the support assembly 1 is unfolded, the movable seat 3 can be separated from the second housing 12, and the second housing 12 may not block the movable seat 3, so that the functional device provided in the movable seat 3 can interact with the user. When the support assembly 1 is folded, the recessed region 114 can be merged with the receiving region 124 to form the moving space 10, and in the present disclosure, the implementations of the movable seat 3 rotating into or out of the moving space 10 can be considered to applied in the case that the support component 1 is in a folded state, and the present disclosure can be mainly described with such example.

In the present disclosure, the movable seat 3 can rotate under a force of the user and may also rotate under a driving force of a driving assembly of the mobile terminal 100. That is, the user can manually rotate the movable seat 3, and the driving assembly can also automatically rotate the movable seat 3. The drive assembly can include a motor and gear set, and the like.

Figure 6:
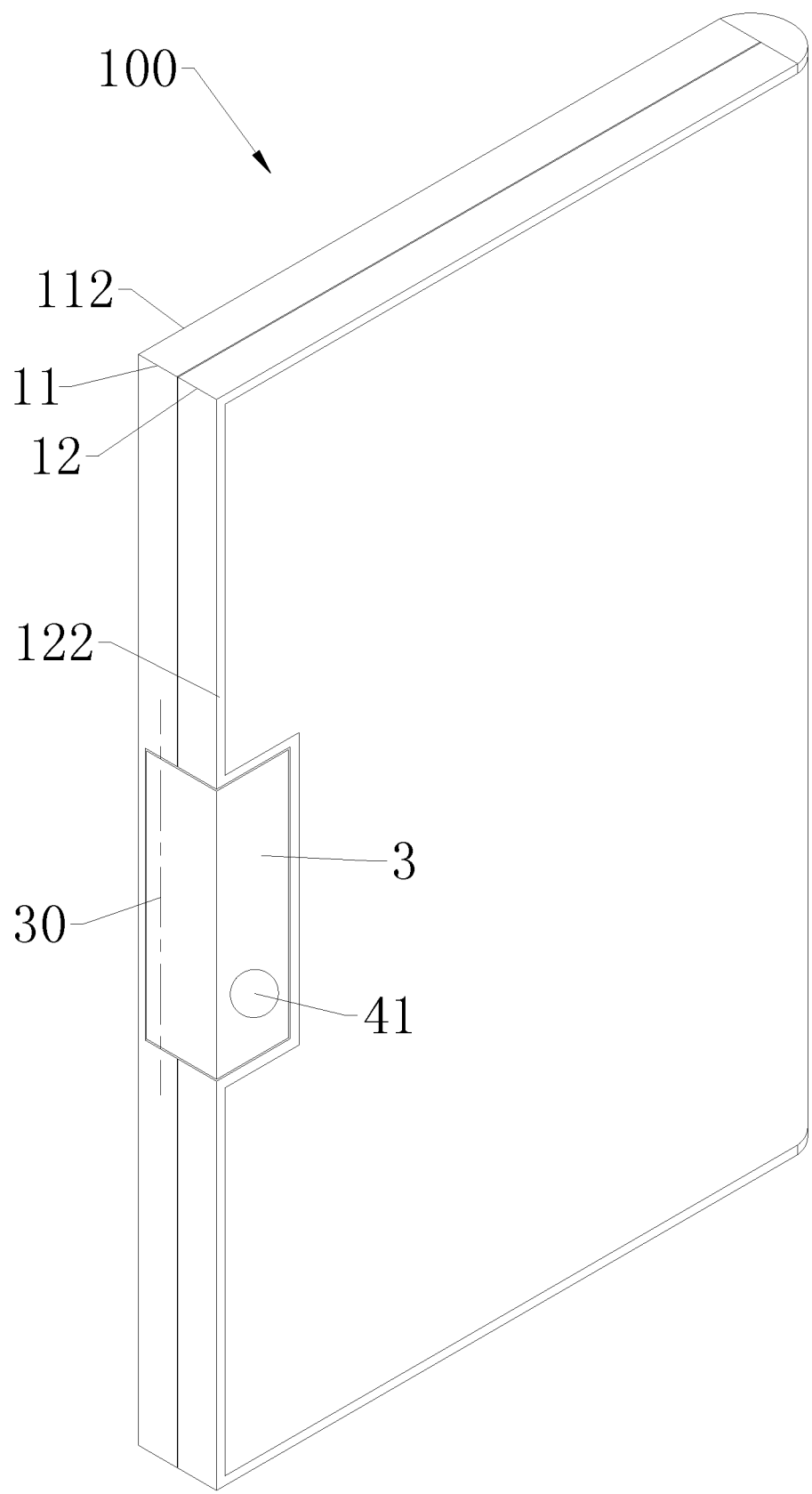
FIG. 6 is a schematic structural diagram illustrating the mobile terminal shown in FIG. 1 in another angle when folded.

In one embodiment, referring to FIG. 5 and FIG. 6, when the movable seat 3 rotates into the moving space 10, a orientation of an image-capturing face of the first camera 41 can coincide with a orientation of the second outer face 122. External light can enter the first camera 41 through the image-capturing face of the first camera 41, so that the first camera 41 can capture an image and complete shooting.

In the present embodiment, since the receiving region 124 can penetrate the second housing 12, thus the moving space 10 may run through the second housing 12, and when the movable seat 3 rotates into the moving space 10, the side of the movable seat 3 having an orientation coinciding with the orientation of the second outer face 122 can be exposed outside the second housing 12. Therefore, when the movable seat 3 rotates into the moving space 10 and the orientation of the image-capturing face of the first camera 41 coincides with the orientation of the second outer face 122, the image-capturing face of the first camera 41 can be exposed, the second housing 12 may not block the first camera 41, and the first camera 41 can shoot when the support assembly 1 is folded or unfolded, and the shooting mode can be diversified, thereby improving the user's use experience.

It can be understood that "the image-capturing face of the first camera 41 can be exposed" means that the image-capturing face of the first camera 41 may not blocked by a component of the mobile terminal 100 that has a light-shielding effect (for example the main display screen 2, etc.), so that shooting can be performed smoothly. Apparently, the image-capturing face of the first camera 41 can still allow to be covered by a light-transmitting lens or the like, to achieve a protection function.

Figure 7:
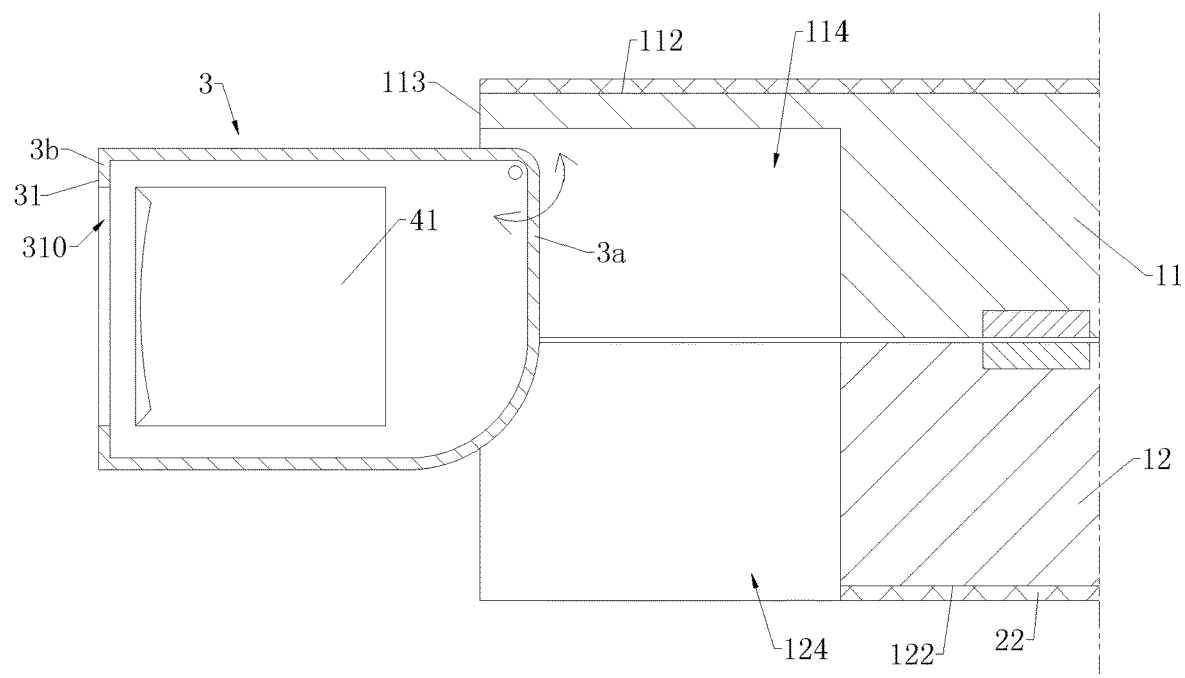
FIG. 7 is a schematic structural diagram illustrating the structure shown in FIG. 5 when the movable seat rotates out of the moving space.

In one embodiment, referring to FIG. 5 to FIG. 7, the direction of a rotation centerline 30 of the movable seat 3 can be parallel to the first outer face 112. The movable seat 3 may include a rotation shaft end 3a and a movable end 3b. The rotation shaft end 3a and the movable end 3b can be two opposite ends of the movable seat 3. The shaft end 3a can be rotatably connected to the first housing 11. The movable end 3b may rotate around the rotation shaft end 3a.

In the present disclosure, the movable seat 3 may have various rotation angles, for example, the movable seat 3 can rotate by about 180° with respect to the first housing 11. In this case, the image-capturing face of the first camera 41 can rotate from a same direction with the orientation of the second outer face 122 to a same orientation with the first outer face 112, so that the orientation of the image-capturing face of the first camera 41 may be changed by rotating the movable seat 3, when the user does not switch the display region (for example, using the first display region 21 or the second display region 22 for displaying), thereby completing a front shooting (for example, self-photography), as well as a rear shooting (such as mutual photography).

Optionally, referring to FIG. 5 and FIG. 7, the movable seat 3 can rotate about 90° with respect to the first housing 11. The present disclosure can be described with such an example. In this case, the rotation shaft end 3a can be received in the recessed region 114. When the movable seat 3 rotates into the moving space 10, the movable end 3b can move close to the second housing 12 to get received in the receiving region 124. When the movable seat 3 rotates out of the moving space 10, the movable end 3b can move away from the second housing 12 to be separated from the receiving region 124. The image-capturing face of the first camera 41 can rotate from a same orientation as the second outer face 122 to a same orientation as the first lateral face 113. When the image-capturing face of the first camera 41 has the same orientation as the first lateral face 113, the displaying can be performed by the second display region 22, and the first housing 11 can bring the first camera 41 to rotate relative to the second housing 12, so that the image-capturing face of the first camera 41 may be rotated to a desired angle to shoot, thereby improving the flexibility of the shooting of the mobile terminal 100 and improving the user experience. Furthermore, during the rotation of the first housing 11 relative to the second housing 12, since the second housing 12 can remain stationary, the first housing 11 and first camera 41 mounted on the first housing 11 will not shake, and when the first camera 41 is used to perform shooting operation such as recording or a panoramic image shooting, which may need to continuously change direction, with the first camera 41 of stability and little shake, the mobile terminal 100 can obtain an image with higher quality, thereby improving the user's use experience.

In one embodiment, referring to FIG. 5 and FIG. 7, the movable seat 3 may include a first outer wall face 31. The first outer wall face 31 may be located at the movable end 3b of the movable seat 3. When the movable seat 3 rotates into the moving space 10, the first outer wall face 31 may have an orientation coinciding with that of the second outer face 122. The first outer wall face 31 may define a through hole 310. The image-capturing face of the first camera 41 can face towards the through hole 310. The projection of the image-capturing face of the first camera 41 on the first outer wall face 31 can be covered by the through hole 310. The light can enter the image-capturing face of the first camera 41 through the through hole 310, and the first camera 41 can capture an image and complete shooting.

In the present disclosure, the first outer wall face 31 can be located at the movable end 3b, and when the movable seat 3 rotates out of the moving space 10, the first outer wall face 31 may move away from the second housing 12, so as to get separated from the receiving region 124, the first outer wall face 31 may be then exposed, and the first camera 41 can perform shooting when the support assembly 1 is in any state (including unfolded, folded, and unfolded with a certain angle).

Figure 8:
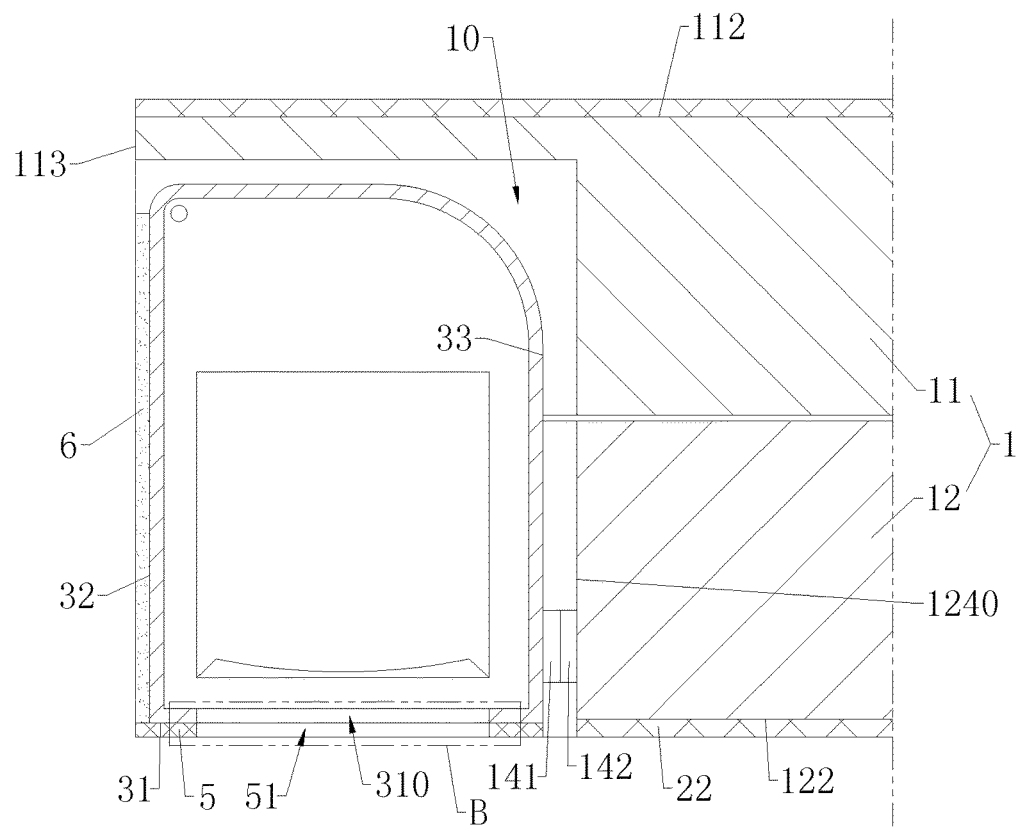
FIG. 8 is a schematic structural diagram illustrating a structure of the mobile terminal shown in FIG. 1 along the line A-A in another embodiment.
Figure 9:
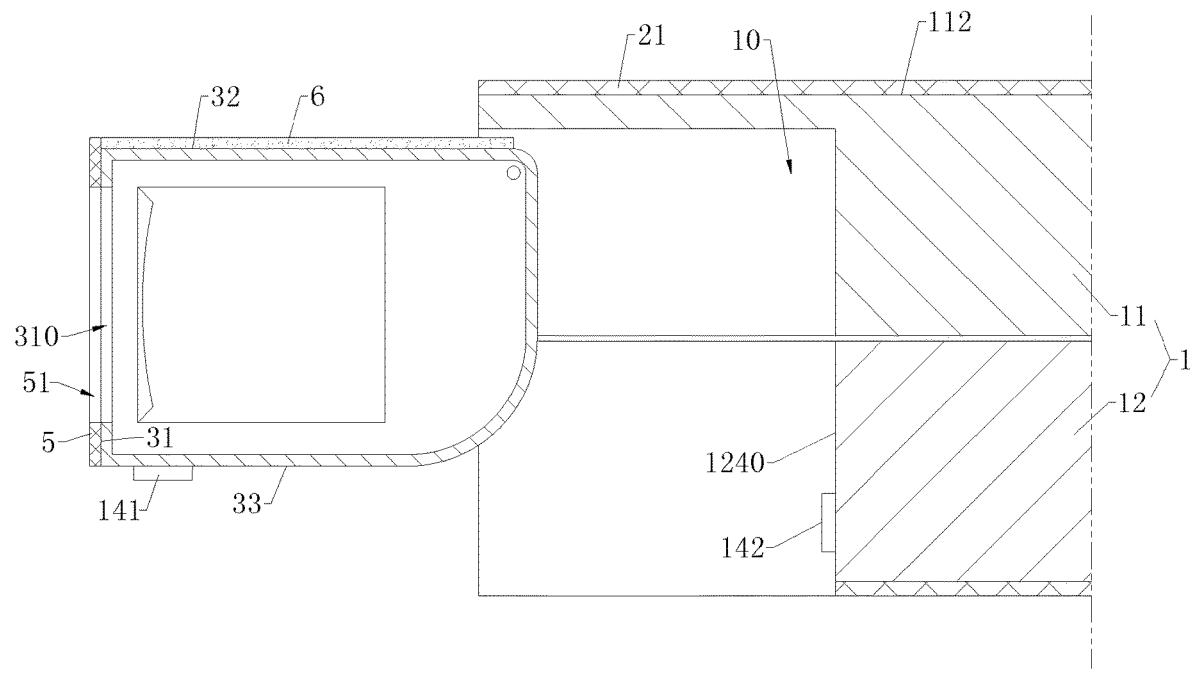
FIG. 9 is a schematic structural diagram illustrating the structure shown in FIG. 8 when the movable seat rotates out of the moving space.

In one embodiment, referring to FIG. 8 and FIG. 9, the mobile terminal 100 may further include a secondary display screen 5. The secondary display screen 5 can be disposed on the first outer wall face 31. The secondary display screen 5 may define a light-transmitting region 51 that may be disposed facing towards the through hole 310.

In the present embodiment, since the secondary display screen 5 may be disposed on the first outer wall face 31, when the movable seat 3 is rotated in, the orientation of the first outer wall face 31 can coincide with the orientation of the first outer face the face 112, so that the secondary display screen 5 can be spliced with the main display screen 2 (the second display region 22), thereby increasing the displaying area, thus the displaying area of the mobile terminal 100 becoming larger, the screen ratio getting higher, further improving the user's viewing experience.

In the present disclosure, the light-transmitting region 51 of the secondary display screen 5 may include various implementations, taking examples as follows.

Figure 10:
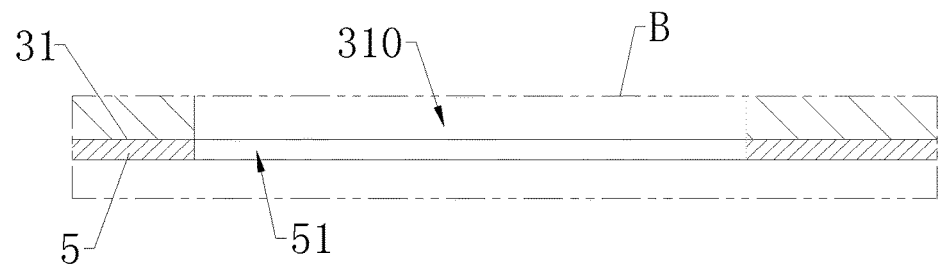
FIG. 10 is a schematic structural diagram illustrating the structure of B in FIG. 8 in one embodiment.

In a first embodiment, referring to FIG. 8 and FIG. 10, the light-transmitting region 51 of the secondary display screen 5 may be hollowed-out. In other words, the secondary display screen 5 can define a through hole penetrating the secondary display screen 5, and the through hole can form the light-transmitting region 51 through which light can enter the first camera 41.

The secondary display screen 5 may not perform image displaying in the light-transmitting region 51, and the secondary display screen 5 may perform image displaying in a peripheral region of the light-transmitting region 51.

Figure 11:
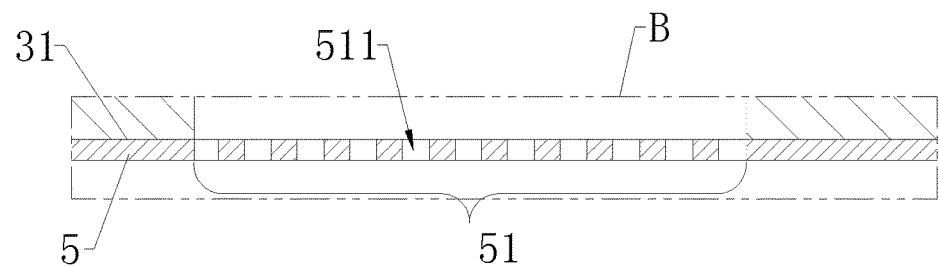
FIG. 11 is a schematic structural diagram illustrating the structure of B in FIG. 8 in another embodiment.

In a second embodiment, referring to FIG. 8 and FIG. 11, the light-transmitting region 51 of the secondary display screen 5 may define a plurality of light-transmitting holes 511 spaced apart from each other. The light-transmitting hole 511 can penetrate through the secondary display screen 5. Light can enter the first camera 41 through the light-transmitting hole 511. The secondary display screen 5 may not perform image displaying in the light-transmitting hole 511, and the secondary display screen 5 may perform image displaying in a peripheral region of the light-transmitting hole 511.

Since the light-transmitting region 51 can define the plurality of light-transmitting holes 511, the first camera 41 can capture an image through the plurality of light-transmitting holes 511, and portions of the light-transmitting region 51 without the light-transmitting hole 511 can still display image, thus increasing the displaying area of the secondary display screen 5, and improving the screen ratio of the mobile terminal 100. The plurality of the light-transmitting holes 511 can be arranged in an array such that the quality of the image captured by the first camera 41 can be higher.

Figure 12:
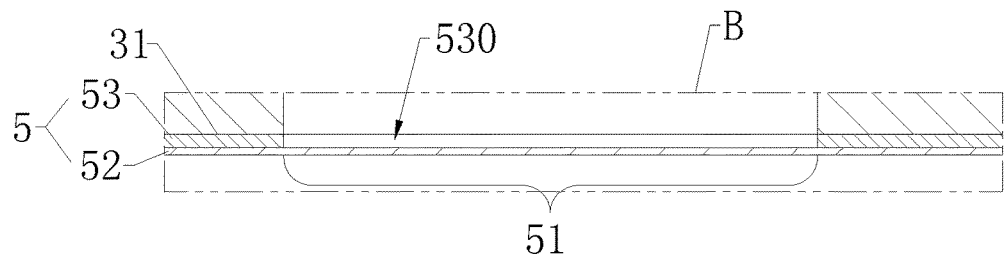
FIG. 12 is a schematic structural diagram illustrating the structure of B in FIG. 8 in additional embodiment.

In a third embodiment, referring to FIG. 8 and FIG. 12, the secondary display screen 5 may include a cover plate 52 and a display module 53, which are stacked. The cover plate 52 may be a transparent cover plate that can allow light to pass through. A portion of the display module 53, located in the light-transmitting region 51, may be hollowed-out. That is, the display module 53 can define a through hole 530 penetrating the display module 53. The through hole 530 can be located in the light-transmitting region 51, and light can pass through the through hole 530 to enter the first camera 41. The display module 53 may not perform image displaying in the light-transmitting region 51, and the display module 53 may perform image displaying in a peripheral region of the light-transmitting region 51.

In the present embodiment, the light-transmitting region 51 can allow all light to pass through, so that the image captured by the first camera 41 may have a higher quality. The cover plate 52 can not only protect the display module 53, but also prevent the external dust and moisture from entering the inside of the second housing 12 through the through hole 310.

Figure 13:
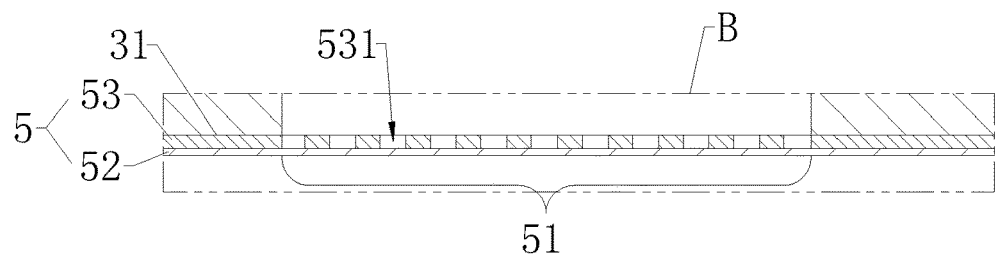
FIG. 13 is a schematic structural diagram illustrating the structure of B in FIG. 8 in additional embodiment.

In a fourth embodiment, referring to FIG. 8 and FIG. 13, the secondary display screen 5 may include a cover plate 52 and a display module 53, which can be stacked. The cover plate 52 may be a transparent cover plate that can allow light to pass through. The display module 53 may define a plurality of hollow holes 531, which can be arranged in the light-transmitting region 51 and spaced apart from each other. The hollow hole 531 may penetrate the display module 53. Light can enter the first camera 41 through the hollow hole 531. The display module 53 may not perform image displaying in the hollow hole 531, and the display module 53 can perform image displaying in a peripheral region of the hollow hole 531.

Since the light-transmitting region 51 can define a plurality of the hollow holes 531, the first camera 41 can capture an image through the light-transmitting region 51, and the portion of the light-transmitting region 51 with no hollow holes 531 can still perform image displaying, such that the displaying area of the secondary display screen 5 can get increased, and the screen ratio of the mobile terminal 100 may become higher. The cover plate 52 can not only protect the display module 53, but also prevent the external dust and moisture from entering the inside of the second housing 12 through the hollow hole 531. The plurality of the hollow holes 531 can be arranged in an array such that the image quality captured by the first camera 41 can be higher.

Figure 14:
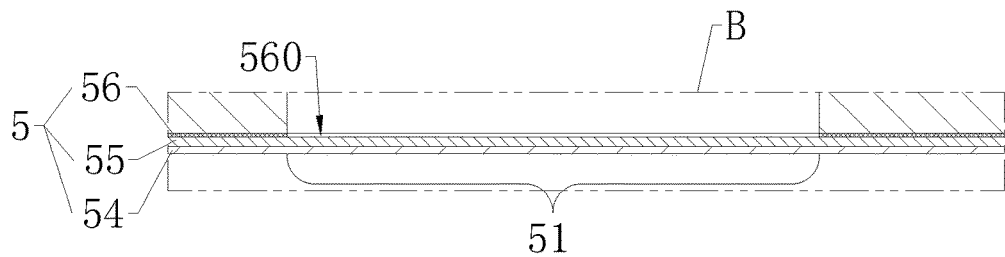
FIG. 14 is a schematic structural diagram illustrating the structure of B in FIG. 8 in additional embodiment.

In a fifth embodiment, referring to FIG. 8 and FIG. 14, the secondary display screen 5 may include a cover plate 54, a display layer 55, and a light-shielding layer 56, which are stacked. The cover plate 54 may be a transparent cover plate that can allow light to pass through. The display layer 55 can be a transparent display layer. The display layer 55 may not only be capable of perform display but also allow light to pass through. A portion of the light-shielding layer 56, located in the light-transmitting region 51, may be hollowed-out. The light-shielding layer 56 can be configured to block light and block the device inside the second housing 12. The light-shielding layer 56 can define a through hole 560 penetrating the light-shielding layer 56. The through hole 560 may be located corresponding to the light-transmitting region 5, and the light can pass through the through hole 560 to enter the first camera 41.

Since the light-transmitting region 51 may define a through hole 560, the first camera 41 can capture an image through the light-transmitting region 51, and the light-transmitting region 51 can still perform image display, so as to avoid reducing the displaying area of the secondary display 5, further to increase the screen ratio of the mobile terminal 100.

Figure 15:
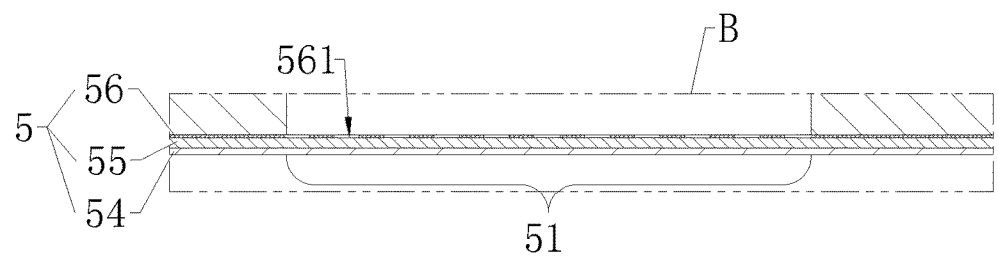
FIG. 15 is a schematic structural diagram illustrating the structure of B in FIG. 8 in additional embodiment.

In a sixth embodiment, referring to FIG. 8 and FIG. 15, the secondary display screen 5 may include a cover plate 54, a display layer 55, and a light-shielding layer 56, which are stacked. The cover plate 54 may be a transparent cover plate that can allow light to pass through. The display layer 55 may be a transparent display layer. The display layer 55 may not only be capable of displaying but also allow light to pass through. The light-shielding layer 56 can be configured to block light and block the device inside the second housing 12. The light-shielding layer 56 may define a plurality of penetration holes 561. The plurality of penetration holes 561 may be arranged in the light-transmitting region 51 and spaced apart from each other. The penetration hole 561 can penetrate the light-shielding layer 56. Light can enter the first camera 41 through the penetration hole 561.

Since the light-transmitting region 51 may define a plurality of the penetration holes 561, the first camera 41 can capture an image through the light-transmitting region 51, and the light-transmitting region 51 can still perform image displaying, so as to avoid reducing the displaying area of the secondary display screen 5, and further to increase the screen ratio of mobile terminal 100. The region of the light-shielding layer 56, without the penetration hole 561, may still be used for blocking light to improve the appearance uniformity of the mobile terminal 100. The plurality of the penetration holes 561 may be arranged in an array such that the image captured by the first camera 41 can be of higher quality.

In one embodiment, referring to FIG. 8, the main display screen 2 may include a second display region 22. The second display region 22 can be stacked on the second outer face 122. When the movable seat 3 rotates into the moving space 10, the secondary display screen 5 can be flush with the second display region 22. In other words, the secondary display 5 can be substantially coplanar with the second display region 22. In this case, the secondary display screen 5 and the second main display screen 2 can achieve better splicing, thereby achieving a better displaying effect.

In one embodiment, referring to FIG. 5, the main display screen 2 may include a second display region 22. The second display region 22 can be stacked on the second outer face 122. When the movable seat 3 rotates into the moving space 10, the first outer wall face 31 can be flush (that is, substantially coplanar) with the face of the second display region 22 away from the second outer face 122. In this case, the mobile terminal 100 may have a better appearance consistency.

In one embodiment, referring to FIG. 8 and FIG. 9, the movable seat 3 further may include a second outer wall face 32. The second outer wall face 32 may be connected to the first outer wall face 31. When the movable seat 3 rotates into the moving space 10, the second outer wall face 32 can be located between the first outer face 112 and the second outer face 122 and located opposite to the support assembly 1, and the second outer wall face 32 may have an orientation the same as that of the first lateral face 113. When the seat 3 rotates out of the moving space 10, the orientation of the second outer wall face 32 may coincide with the orientation of the first outer face 112. The mobile terminal 100 may further include an additional display screen 6, and the additional display screen 6 may be disposed on the second outer wall face 32.

In the present embodiment, when the movable seat 3 rotates into the moving space 10, the mobile terminal 100 can be displayed on the lateral face by the additional display screen 6, thereby enriching the display mode. When the movable seat 3 rotates out of the moving space 10, the additional display screen 6 can be spliced with the first display region 21 of the main display screen 2, thereby increasing the displaying area, so as to improve the large screen displaying effect of the mobile terminal 100.

Herein, when the movable seat 3 rotates out of the moving space 10, the additional display screen 6 may be parallel to the first display region 21 to improve the displaying effect after the additional display screen 6 is spliced with the first display region 21.

Figure 16:
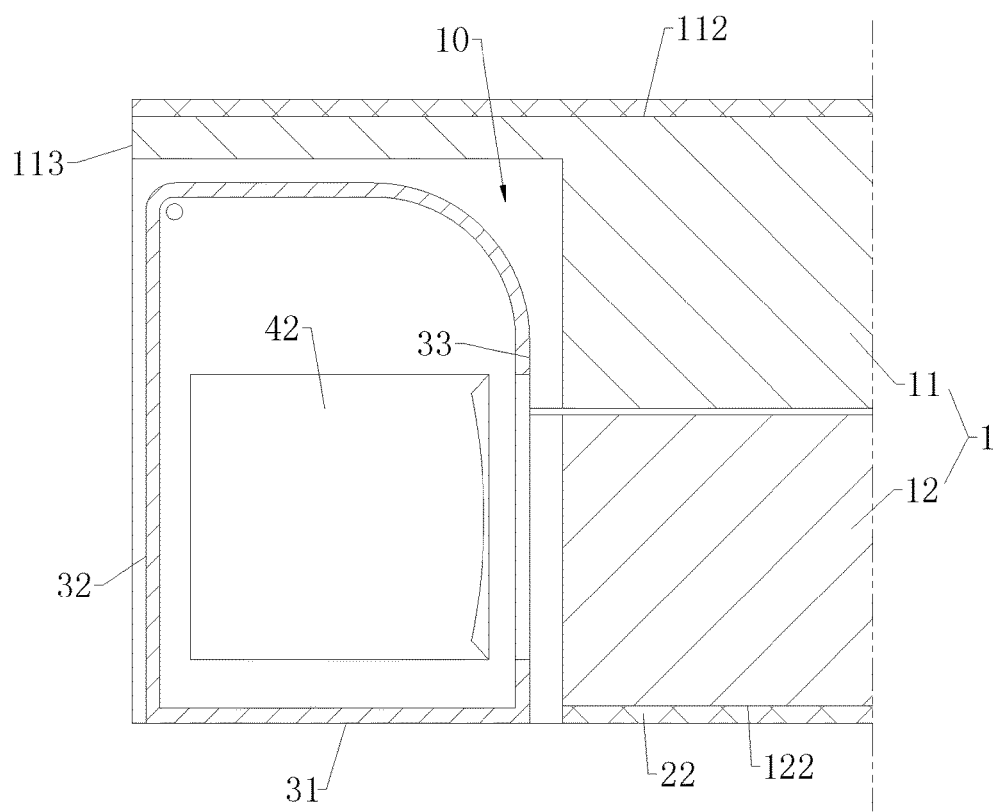
FIG. 16 is a schematic structural diagram illustrating the structure of the mobile terminal shown in FIG. 1 along the line C-C.
Figure 17:
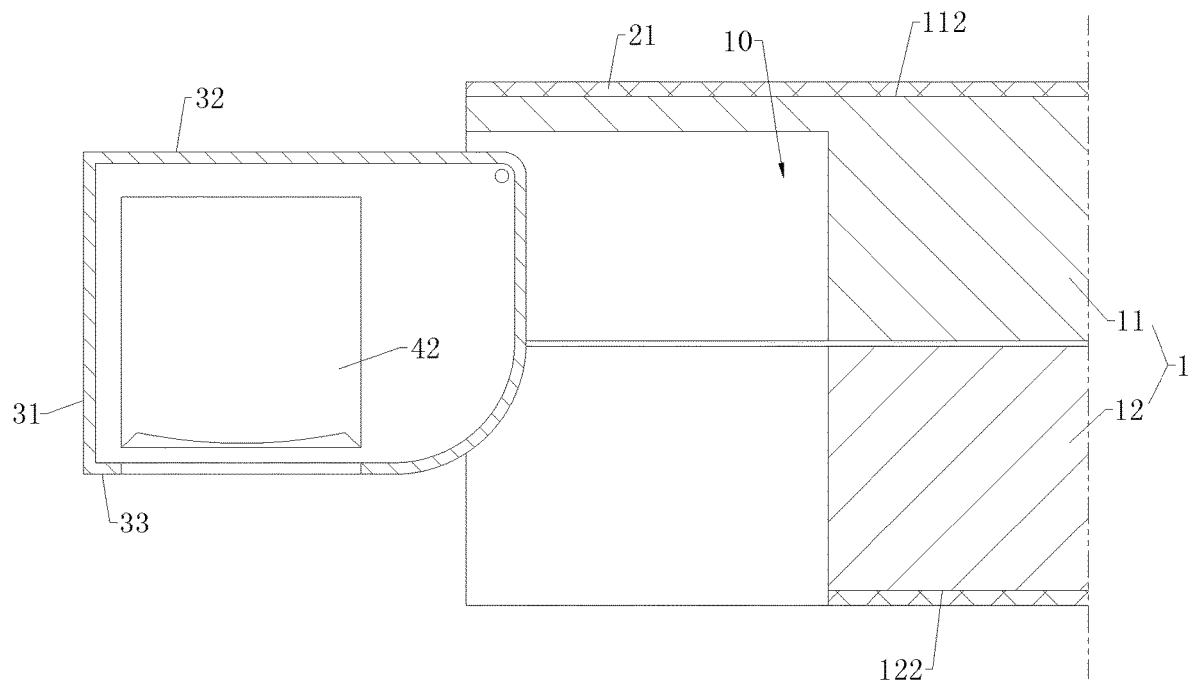
FIG. 17 is a schematic structural diagram illustrating the structure shown in FIG. 16 when the movable seat rotates out of the moving space.
Figure 18:
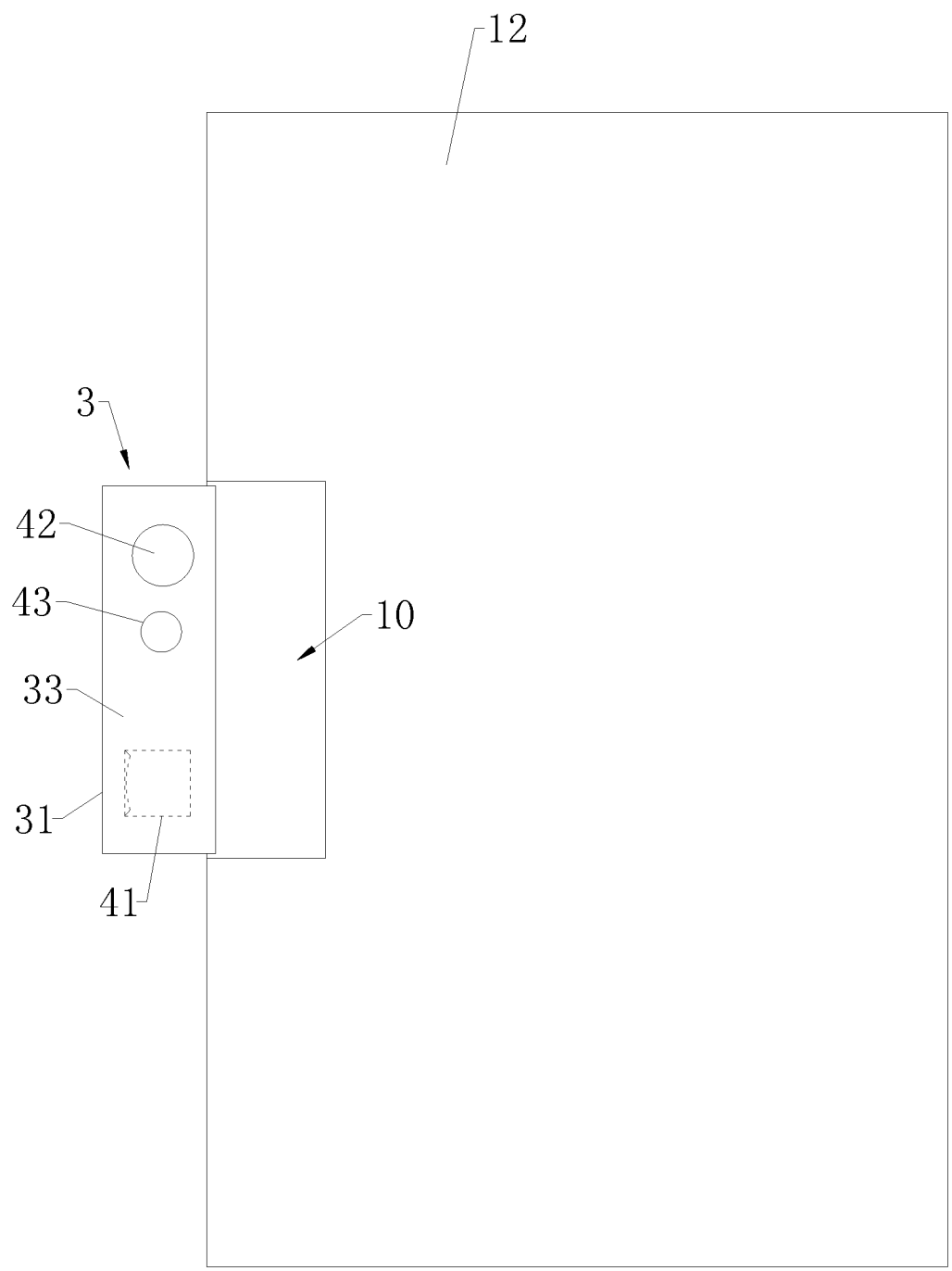
FIG. 18 is a schematic structural diagram illustrating the mobile terminal of FIG. 6 when the movable seat rotates out of the moving space.

In one embodiment, referring to FIG. 16 to FIG. 18, the movable seat 3 may further include a third outer wall face 33. The third outer wall face 33 can be connected to the first outer wall face 31 and disposed opposite to the second outer wall face 32. When the movable seat 3 rotates into the moving space 10, the third outer wall face 33 can be located between the first outer face 112 and the second outer face 122 and may face towards the support assembly 1, and the third outer wall face 33 may be disposed opposite to the first lateral face 113. When the movable seat 3 rotates out of the moving space 10, the orientation of the third outer wall face 33 may coincide with the orientation of the second outer face 122. The movable seat 3 may further include a second camera 42, which may have an image-capturing face with an orientation coinciding with the orientation of the third outer wall face 33.

In the present embodiment, when the movable seat 3 rotates into the moving space 10, the second camera 42 may be received in the moving space 10 and can be blocked by the support component 1, and the second camera 42 cannot shoot. When the movable seat 3 rotates out of the moving space 10, the image-capturing face of the second camera 42 may have an orientation coincide with the orientation of the second outer face 122, the image-capturing face of the second camera 42 can be exposed, and thus the second camera 42 can be capable of shooting.

In the present embodiment, when the movable seat 3 rotates into the moving space 10, the mobile terminal 100 may perform shooting by the first camera 41, and when the movable seat 3 rotates out of the moving space 10, the mobile terminal 100 can perform shooting by the first camera 41 or the second camera 42. Therefore, the shooting mode of the mobile terminal 100 can be diversified, and the user experience can be improved.

In an embodiment, referring to FIG. 18, and the movable seat 3 may further be provided with a flash lamp 43. The orientation of the light-emitting face of the flash lamp 43 may coincide with the orientation of the third outer wall face 33. The orientation of the light-emitting face of the flash lamp 43 may coincide with the orientation of the image-capturing face of the second camera 42, so as to fill light for the second camera 42.

In the present embodiment, in a poor shooting environment, the movable seat 3 can rotate out of the moving space 10 to expose the image-capturing face of the second camera 42 and light-emitting face of the flash lamp 43, the flash lamp 43 filling light for the second camera 42, and thus the second camera 42 can capture a picture of higher quality.

The number of the second cameras 42 in the movable seat 3 may be one or more. For example, the number of the second cameras 42 may be two, enabling wide-angle shooting and telephoto shooting.

Figure 19:
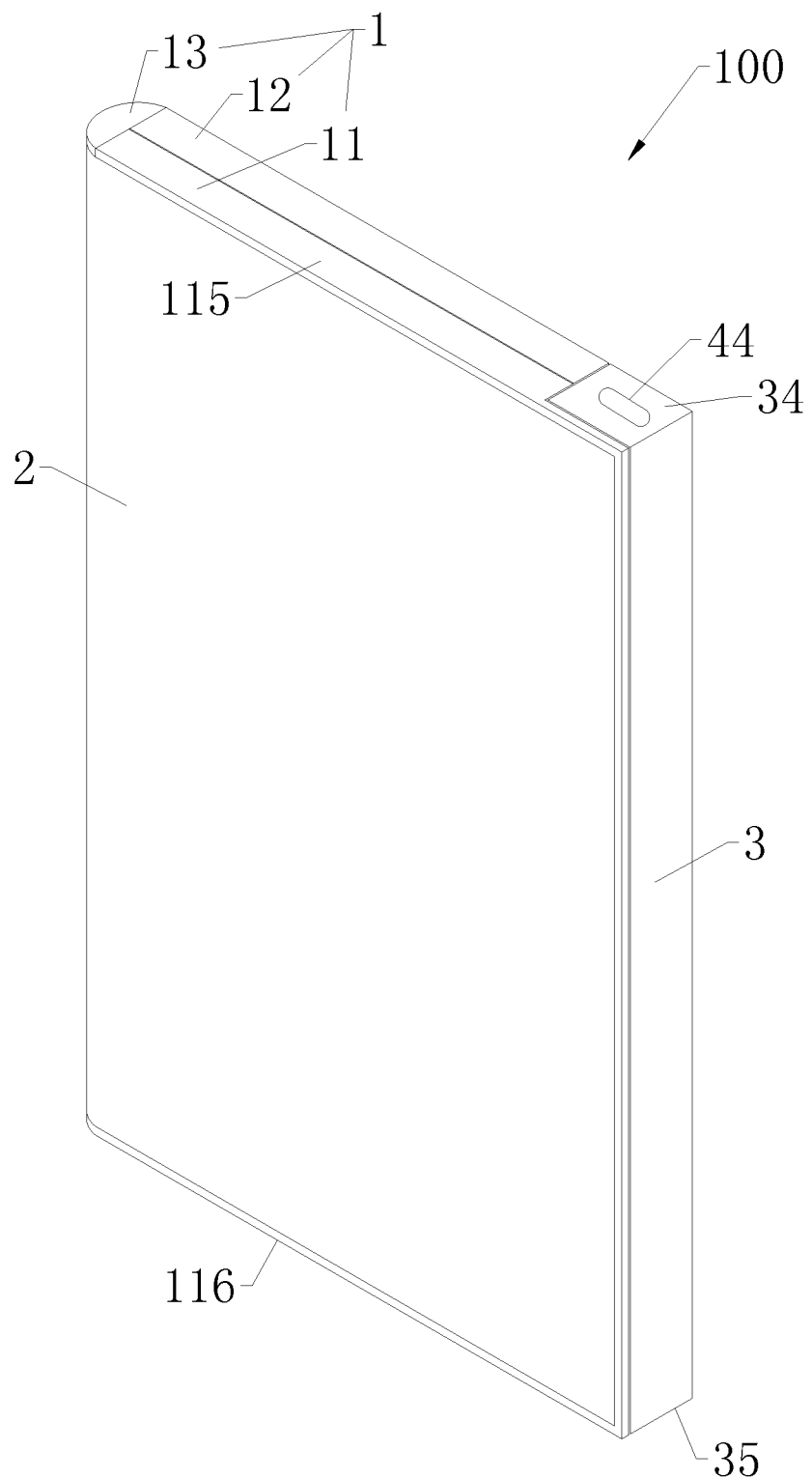
FIG. 19 is a schematic structural diagram illustrating a mobile terminal according to another embodiment of the present disclosure.
Figure 20:
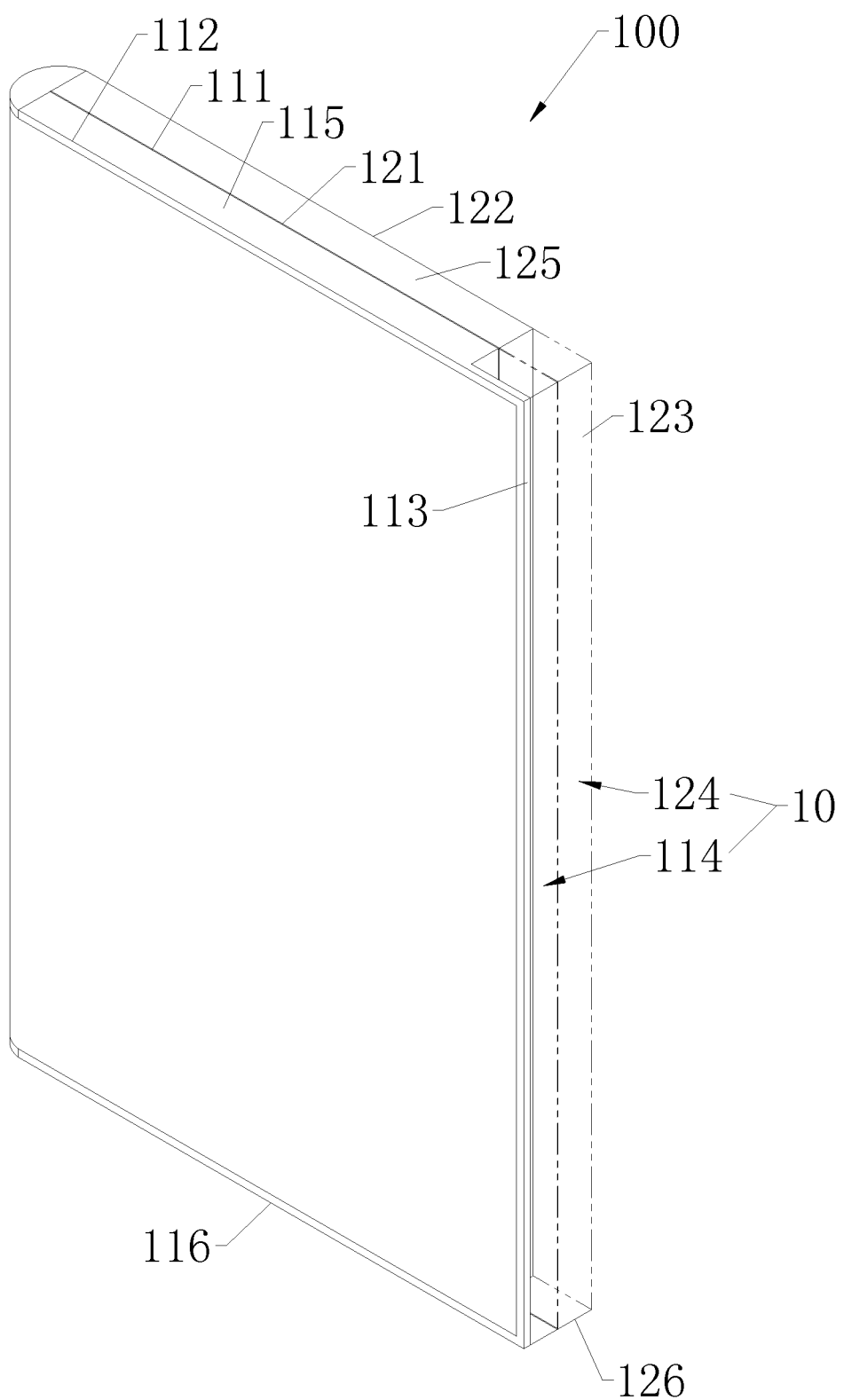
FIG. 20 is a schematic structural diagram illustrating a support assembly of the mobile terminal shown in FIG. 19.

In one embodiment, referring to FIG. 19 and FIG. 20, the first housing 11 may further include a third lateral face 115 and a fourth lateral face 116. The third lateral face 115 and the fourth lateral face 116 may both be connected between the first inner face 111 and the first outer face 112. The third lateral face 115 and the fourth lateral face 116 can be configured opposite to each other. The third lateral face 115 can be disposed on one side of the first lateral face 113 and the fourth lateral face 116 can be disposed on an opposite side of the first lateral face 113. The recessed region 114 may penetrate the first housing 11 from the third lateral face 115 to the fourth lateral face 116.

In the present embodiment, since the recessed region 114 can penetrate the first housing 11 from the third lateral face 115 to the fourth lateral face 116, the recessed region 114 can well utilize the space of the mobile terminal 100 in the direction from the third lateral face 115 to the fourth lateral face 116, thus the recessed region 114 having a large volume, facilitating the processing, and improving the consistency of appearance and shape of the mobile terminal 100. Similarly, since the volume of the recessed region 114 can be large, the volume of the movable seat 3 that may cooperate with the recessed region 114 can also be large, so that the movable seat 3 can accommodate more functional devices, thus enabling the arrangement of the functional devices on the mobile terminal 100 to be more flexible and diversified.

Herein, the second housing 12 may further include a fifth lateral face 125 and a sixth lateral face 126. The fifth lateral face 125 and the sixth lateral face 126 can both be connected between the second inner face 121 and the second outer face 122. The fifth lateral face 125 and the sixth lateral face 126 may be configured opposite to each other. The fifth lateral face 125 can be disposed on one side of the second lateral face 123, and the sixth lateral face 126 can be disposed on an opposite side of the second lateral face 123. The receiving region 124 can penetrate the second housing 12 from the fifth lateral face 125 to the sixth lateral face 126.

In other embodiments, the recessed region 114 may extend to the third lateral face 115 or the fourth lateral face 116, and the shape of the receiving region 124 may correspond to the shape of the recessed region 114. The movable seat 3 may get exposed from one end (top end or bottom end) of the mobile terminal 100. Optionally, referring to FIG. 3, FIG. 4 and FIG. 6, the recessed region 114 may not extend to the third lateral face 115 and the fourth lateral face 116, and the shape of the receiving region 124 can correspond to the shape of the recessed region 114, and the moving space 10 may form a "bang" region of the mobile terminal 100, when the support assembly 1 is folded. When the movable seat 3 rotates into the moving space 10, the movable seat 3 can be located in the "bang" region of the mobile terminal 100.

In an embodiment, referring to FIG. 19, the movable seat 3 can further be provided with an earpiece 44. The movable seat 3 may include a fourth outer wall face 34 and a fifth outer wall face 35, which can be disposed opposite to each other. The fourth outer wall face 34 may have an orientation the same as an orientation of the third lateral face 115. The fifth outer wall face 35 may have an orientation the same as an orientation of the fourth lateral face 116. A sound hole of the earpiece 44 can be provided on at least one of the fourth outer wall face 34 or the fifth outer wall face 35. In other words, the sound hole of the earpiece 44 may be merely disposed on the fourth outer wall face 34 or the fifth outer wall face 35, or may be disposed both on the fourth outer wall face 34 and on the fifth outer wall face 35. The sound of the earpiece 44 is transmitted through the sound hole.

In the present embodiment, since the sound hole of the earpiece 44 can be disposed on at least one of the fourth outer wall face 34 and the fifth outer wall face 35, the sound hole may not be blocked. The earpiece 44 can emit sound when the support assembly 1 is unfolded or folded to interact with the user. In this case, the earpiece 44 can also be close to at least one of the top or the bottom of the mobile terminal 100, so that the user can be close to the earpiece 44 when answering the phone to better receive the sound emitted by the earpiece 44, which may improve user experience.

In an embodiment, at least one of an iris recognition module, a face recognition module, a microphone (also called a phone transmitter), a photoreceptor, and a fingerprint module, may further be disposed on the movable seat 3. The above functional device (for example, the photoreceptor, the fingerprint module, etc.) may be disposed in the movable seat 3 so as to be unfolded in accordance with the support assembly 1 when needed, and get folded in accordance with the support assembly 1 when not needed, without taking up the outer space of the mobile terminal 100, thus providing the main display screen 2 with a large displaying area so as to increase the screen ratio of the mobile terminal 100. The functional devices accommodated in the movable seat 3 can be arranged in a stagger distribution to avoid the thickness of the mobile terminal 100 being too large due to overlapping placement.

Figure 21:
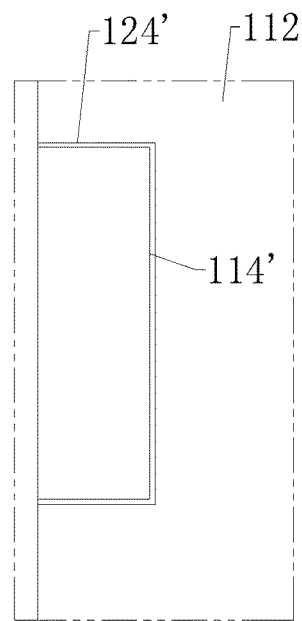
FIG. 21 is a schematic diagram illustrating a projection relationship on a first outer face between a receiving region and a recessed region of the support assembly shown in FIG. 4.

In one embodiment, referring to FIG. 21, when the support assembly 1 is folded, a projection 124' of the receiving region 124 on the first outer face 112 may cover a projection 114' of the recessed region 114 on the first outer face 112. In this case, not only the movable seat 3 can be well accommodated in the moving space 10, but also the wall face of the receiving region 124 can not hinder the rotation of the movable seat 3, thereby ensuring that the movable seat 3 can smoothly rotate into or out of the moving space.

In the present disclosure, the main display screen 2 can have various implementations, taking examples as follows.

In one embodiment, referring to FIG. 2, the main display screen 2 may be a flexible display screen. The first outer face 112, an outer face of the bending member 13 and the second outer face 122 can collectively carry the main display screen 2. A first side of the outer face of the bending member 13 can be connected to the first outer face 112. A second side opposite to the first side of the outer face of the bending member 13 can be connected to the second outer face 122.

The main display screen 2 may be an organic light-emitting diode (OLED) display screen.

Figure 22:
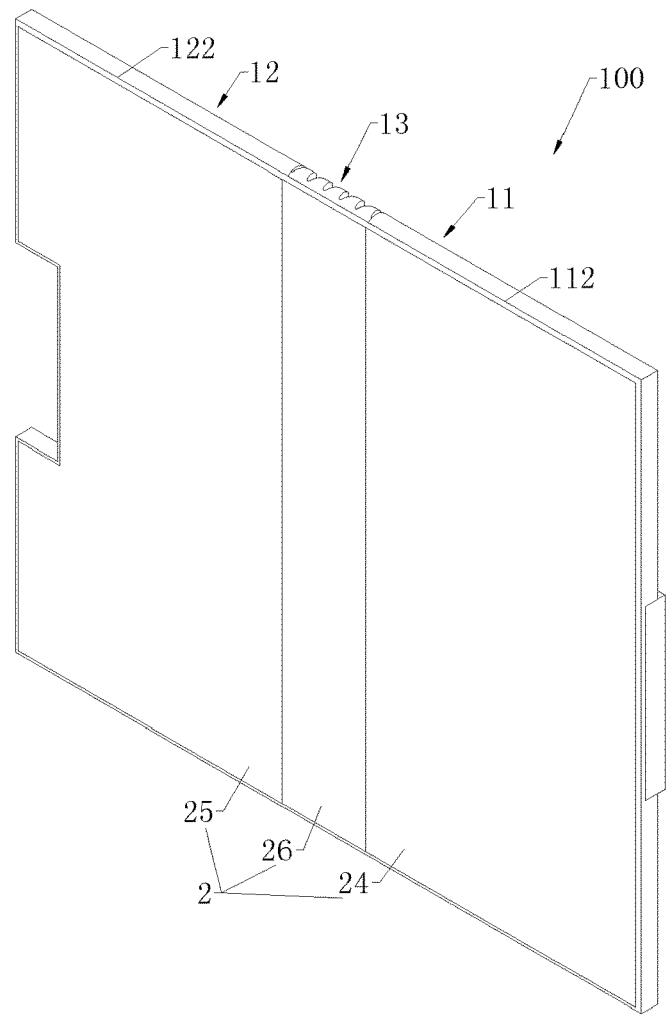
FIG. 22 is a schematic structural diagram illustrating a mobile terminal according to additional embodiment of the present disclosure.

In another embodiment, referring to FIG. 22, the display screen 2 may include a first sub-display screen 24 and a second sub-display screen 25. The first sub-display screen 24 and the second sub-display screen 25 may be two display screens that are independent of each other. The first sub-display screen 24 can be laid on the first outer face 112. The second sub-display screen 25 can be laid on the second outer face 122. The outer face of the bending member 13 can be laid with a flexible third sub-display 26, which can be connected to the first sub-display 24 and the second sub-display 25. Of course, in other embodiments, the outer face of the bending member 13 may not be laid with display screens.

The first sub-display 24 may be a liquid crystal display (LCD) or an organic light-emitting diode (OLED) display. The second sub-display 25 may be a liquid crystal display or an organic light emitting diode display. The third sub-display 26 can be an organic light emitting diode display.

In the present disclosure, referring to FIG. 5, the support assembly 1 may have a locking structure (141, 142) to fix the first housing 11 relative to the second housing 12, when the support assembly 1 is in a folded state, so as to facilitate users carrying the mobile terminal 100. The locking structure (141, 142) can have various implementations, taking examples as follows.

The support assembly 1 can further include a first locking member 141 and a second locking member 142. The first locking member 141 can be disposed on the first housing 11. The second locking member 142 can be disposed on the second housing 12. When the support assembly 1 is folded, the first locking member 141 can cooperate with the second locking member 142.

Herein, the first locking member 141 may be a first permanent magnet. The first permanent magnet may be fixed to the first inner face 111. The second locking member 142 may be a second permanent magnet. The second permanent magnet may be fixed to the second inner face 121. A first end of the first permanent magnet may face towards a second end of the second permanent magnet, and the first end of the first permanent magnet can be configured with a magnetic pole opposite to that of the second end of the second permanent magnet. When the support assembly 1 is folded, the first permanent magnet and the second permanent magnet can be magnetically attracted.

Optionally, the first locking member 141 can be a block protruding from the first inner face 111. The second locking member 142 can be a slot recessed in the second inner face 121. When the support assembly 1 is folded, the block can be engaged with the slot. And the block may have an interference fit with a wall of the slot to increase a locking force between the block and the slot.

In other embodiments, referring to FIG. 8 and FIG. 9, different from the foregoing embodiments, the first locking member 141 can be disposed on the third outer wall face 33 of the movable seat 3. The second locking member 142 can be disposed on a groove wall 1240 of the receiving region 124. For example, the first locking member 141 can be a block protruding from the third outer wall face 33 of the movable seat 3. The second locking member 142 can be a slot that can be recessed in the groove wall of the receiving region 124. When the support assembly 1 is folded, the block can be engaged with the slot. The block may have an interference fit with the groove wall of the slot to increase the locking force between the block and the slot. Optionally, the first locking member 141 may be a first permanent magnet. The second locking member 142 may be a second permanent magnet. A first end of the first permanent magnet may face towards a second end of the second permanent magnet, and the first end of the first permanent magnet can be configured with an magnetic pole opposite to that of the second end of the second permanent magnet. When the support assembly 1 is folded, the first permanent magnet and the second permanent magnet can be magnetically attracted.

Figure 23:
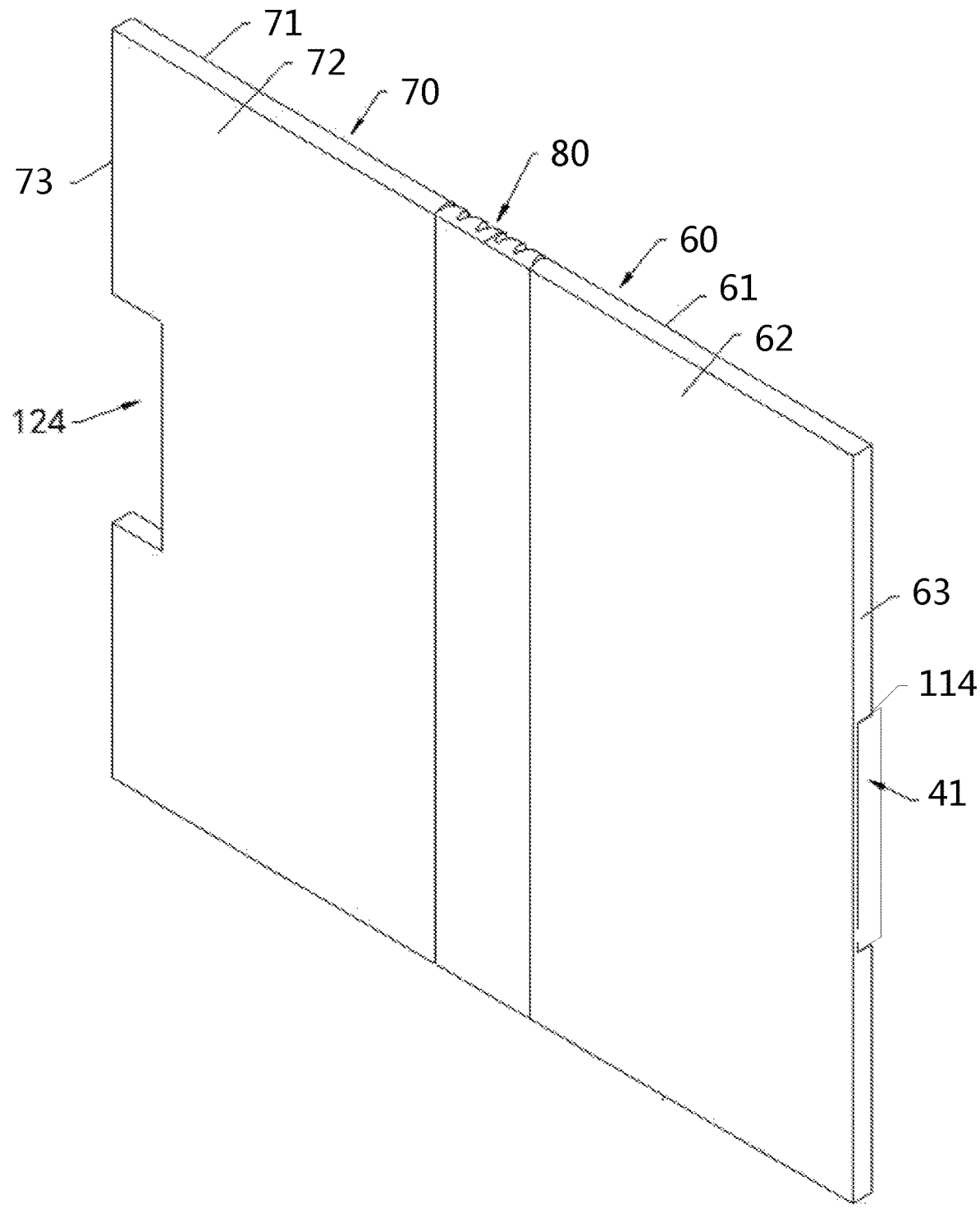
FIG. 23 is a schematic structural diagram illustrating a mobile terminal according to additional embodiment of the present disclosure.

FIG. 4, FIG. 6 and FIG. 23 illustrate a mobile terminal. The mobile terminal according to an embodiment of the present disclosure may include a first display part 60, a second display part 70, and a fold joint 80, wherein the fold joint 80 may be connected between the first display part 60 and the second display part 70, the fold joint 80 may be configured to get unfolded or folded to unfold or fold the first display part 60 and the second display part 70; the first display part 60 may include a first folded face 61 connected to the fold joint 80, a first outer face 62 connected to the fold joint 80, a first lateral face 63 connected to the first folded face 61 and the first outer face 63, and away from the fold joint 80; wherein the first outer face 63 may be configured to display and opposite to the first folded face 61, a mounting slot 114 may be defined at the first folded face 61 and may extend to the first lateral face 63; the second display part 70 may include a second folded face 71 connected to the fold joint 80, a second outer face 72 connected to the fold joint 80, a second lateral face 73 connected to the second folded face 71 and the second outer face 72, and away from the fold joint 80; wherein the second outer face 72 may be configured to display and opposite to the second folded face 71, an escape hole 124 may be defined by the second display part 70, may penetrate the second folded face 71 and the second outer face 72, and may extend to the second lateral face 73; when the fold joint 80 is folded, the first folded face 61 may be faced to the second folded face 71, the mounting slot 114 and the escape hole 124 may communicate with each other to form a receiving space, a camera 41 may be rotatably connected to a wall of the mounting slot 114 to rotate into or out of the receiving space.

Figure 24:
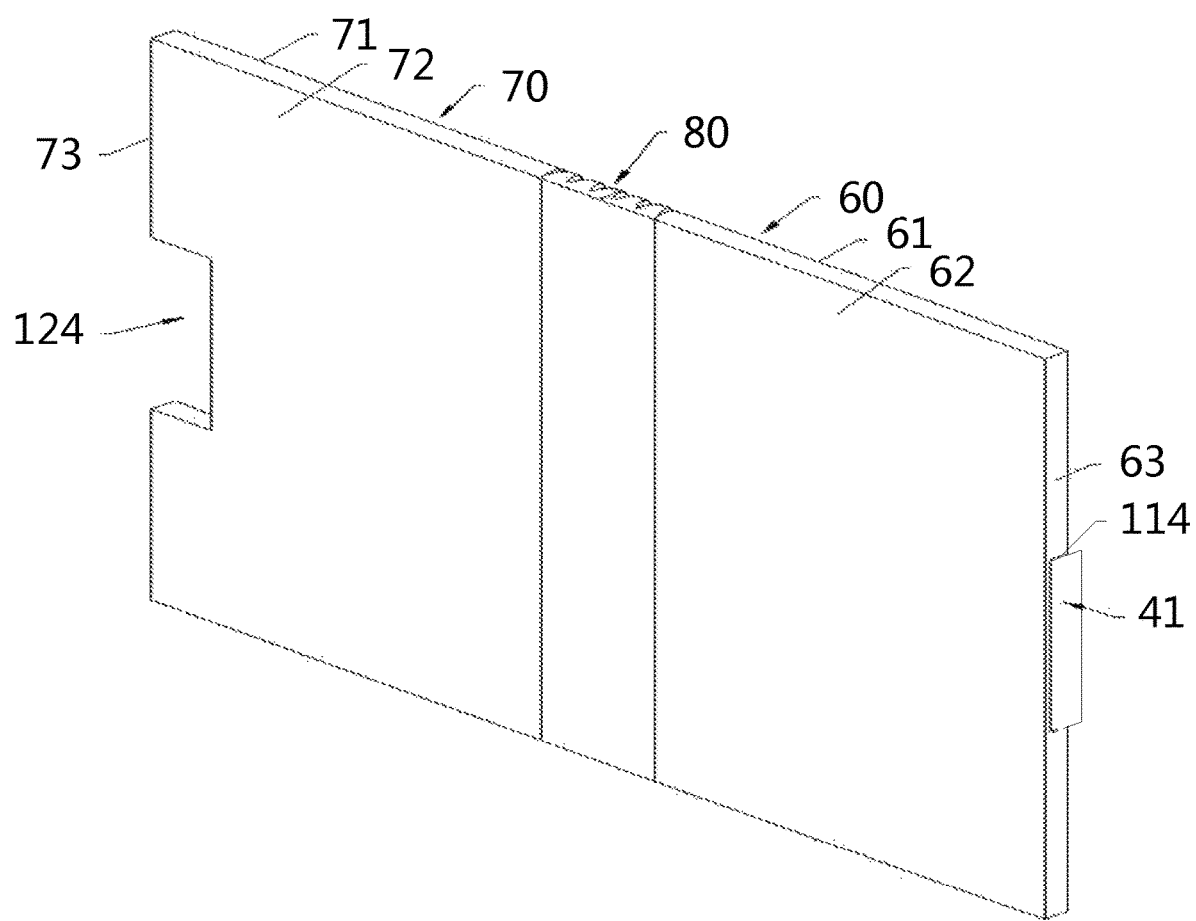
FIG. 24 is a schematic structural diagram illustrating a camera assembly according to additional embodiment of the present disclosure.

FIG. 4, FIG. 6 and FIG. 24 illustrate a camera assembly. The camera assembly according to an embodiment of the present disclosure may include a first portion 60, a second portion 70, and a fold joint 80, wherein the fold joint 80 may be connected between the first portion 60 and the second portion 70, the fold joint 80 may be configured to get unfolded or folded to unfold or fold the first portion 60 and the second portion 70; the first portion 60 may include a first folded face 61 connected to the fold joint 80, a first outer face 62 connected to the fold joint 80, and opposite to the first folded face 61, a first lateral face 63 connected to the first folded face 61 and the first outer face 63, and away from the fold joint 80; wherein a mounting slot 114 may be defined at the first folded face 61 and may extend to the first lateral face 63; the second portion 70 may include a second folded face 71 connected to the fold joint 80, a second outer face 72 connected to the fold joint 80, and opposite to the second folded face 71, a second lateral face 73 connected to the second folded face 71 and the second outer face 72, and away from the fold joint 80; wherein an escape hole 124 may be defined by the second portion 70, may penetrate the second folded face 71 and the second outer face 72, and may extend to the second lateral face 73; when the fold joint 80 is folded, the first folded face 61 may be faced to the second folded face 71, the mounting slot 114 and the escape hole 124 communicate with each other to form a receiving space, a camera 41 may be rotatably connected to a wall of the mounting slot 114 to rotate into or out of the receiving space.

The embodiments of the present disclosure have been described in detail above, and the principles and implementations of the present disclosure are described in the specific examples. The description of the above implementations is only used to help understand the method and core spirit of the present disclosure. In the meantime, one with ordinary skills in the art may obtain modifications on the specific embodiments and the application range according to the spirit of the present disclosure. In a word, the description shall not be considered as a limit to the present disclosure.

What is claimed is:

1. A mobile terminal, comprising a support assembly, a main display screen and a movable seat, the support assembly comprising a first housing, a second housing and a bending member, wherein the bending member is connected between the first housing and the second housing, and the bending member gets unfolded or bent to unfold or fold the support assembly;

the first housing comprises a first inner face, a first outer face, and a first lateral face, the first outer face carrying the main display screen, the first inner face disposed opposite to the first outer face, the first lateral face connected between the first inner face and the first outer face, and the first housing defines a recessed region concaving in a direction from the first inner face to the first outer face, the recessed region extending to the first lateral face;

the second housing comprises a second inner face, a second outer face, and a second lateral face, the second outer face carrying the main display screen, the second inner face disposed opposite to the second outer face, the second lateral face connected between the second inner face and the second outer face, and the second housing defines a receiving region penetrating through the second inner face to the second outer face and extending to the second lateral face;

when the support assembly is folded, the second inner face is disposed facing to the first inner face, the receiving region and the recessed region are merged to form a moving space, and the movable seat is provided with a first camera, the movable seat is rotatably connected to the first housing to bring the first camera to rotate into or out of the moving space;

wherein a direction an image-capturing face of the first camera faces coincides with a direction the second outer face faces, when the movable seat rotates into the moving space;

wherein the movable seat comprises a first outer wall face, a direction the first outer wall face faces coincides with the direction the second outer face faces, when the movable seat rotates into the moving space, and the first outer wall face defines a through hole, with the image-capturing face, of the first camera facing towards the through hole;

wherein the movable seat further comprises a second outer wall face, the second outer wall face is connected to the first outer wall face; the second outer wall face is located between the first outer face and the second outer face and located opposite to the support assembly, when the movable seat rotates into the moving space; a direction the second outer wall face faces coincides with a direction the first outer face faces, when the movable seat rotates out of the moving space; and the mobile terminal further comprises an additional display, screen disposed on the second outer wall face.

2. The mobile terminal according to claim 1, wherein the mobile terminal further comprises a secondary display screen, the secondary display screen is disposed on the first outer wall face, the secondary display screen comprising a light-transmitting region facing towards the through hole.

3. The mobile terminal according to claim 2, wherein the light-transmitting region is hollowed-out.

4. The mobile terminal according to claim 2, wherein the light-transmitting region defines a plurality of light-transmitting holes spaced apart from each other.

5. The mobile terminal according to claim 2, wherein the secondary display screen comprises a cover plate and a display module, which are stacked, and a portion of the display module, corresponding to the light-transmitting region, is hollowed-out.

6. The mobile terminal according to claim 2, wherein the secondary display screen comprises a cover plate and a display module, which are stacked, the display module defines a plurality of hollow holes, and the plurality of hollow holes are spaced apart from each other in a region corresponding to the light-transmitting region.

7. The mobile terminal according to claim 2, wherein the secondary display screen comprises a cover plate, a display layer and a light-shielding layer, which are stacked, wherein the display layer is a transparent display layer, a portion of the light-shielding layer, corresponding to the light-transmitting region, is hollowed-out.

8. The mobile terminal according to claim 2, wherein the secondary display screen comprises a cover plate, a display layer and a light-shielding layer, which are stacked, wherein the display layer is a transparent display layer, and the light-shielding layer defines a plurality of a penetration holes spaced apart from each other in a region corresponding to the light-transmitting region.

9. The mobile terminal according to claim 2, wherein the main display screen comprises a display part, the display part is stacked on the second outer face, and when the movable seat rotates into the moving space, the secondary display screen is flush with the display part.

10. The mobile terminal according to claim 1, wherein the main display screen comprises a display part, the display part is stacked on the second outer face, and the first outer wall face is flush with a face of the display part away from the second outer face, when the movable seat rotates into the moving space.

11. The mobile terminal according to claim 1, wherein the movable seat further comprises a third outer wall face, the third outer wall face connected to the first outer wall face and disposed opposite to the second outer wall face; the third outer wall face is located between the first outer face and the second outer face and faced towards the support assembly, when the movable seat rotates into the moving space; a direction the third outer wall face faces coincides with the direction the second outer face faces, when the movable seat rotates out of the moving space; and the movable seat is further provided with a second camera, and a direction an image-capturing face of the second camera faces coincides with the direction the third outer wall face faces;
   wherein the movable seat is further provided with a flash lamp, and a direction a light-emitting face of the flash lamp faces coincides with the direction the third outer wall face faces.

12. The mobile terminal according to claim 1, wherein the first housing further comprises a third lateral face and a fourth lateral face, the third lateral face and the fourth lateral face both connected between the first inner face and the first outer face, the third lateral face and the fourth lateral face are disposed opposite to each other and the third lateral face is connected to one side of the first lateral face, and the fourth lateral face is connected to an opposite side of the first lateral face, the recessed region penetrates from the third lateral face to the fourth lateral face;
   wherein the movable seat is further provided with an earpiece, the movable seat comprises a fourth outer wall face and a fifth outer wall face disposed opposite to each other, a direction the fourth outer wall face faces coincides with a direction the third lateral face faces, a direction the fifth outer wall face faces coincides with a direction the fourth lateral face faces, and at least one of the fourth outer wall face and the fifth outer wall face defines a sound hole.

13. The mobile terminal according to claim 12, wherein the fourth outer wall face is flush with the third lateral face, the fifth outer face is flush with the fourth lateral face, when the movable seat rotates into the moving space.

14. The mobile terminal according to claim 1, wherein a projection of the receiving region on the first outer face covers a projection of the recessed region on the first outer face, when the support assembly is folded.

15. The mobile terminal according to claim 1, wherein the main display screen is a flexible display screen, and the first outer face, an outer face of the bending member, and the second outer face collectively carry the main display screen.

16. The mobile terminal according to claim 1, wherein the main display screen comprises a first sub-display screen laid on the first outer face and a second sub-display screen laid on the second outer face.

17. A mobile terminal, comprising a first display part, a second display part, and a fold joint, wherein the fold joint is connected between the first display part and the second display part, the fold joint is configured to get unfolded or folded to unfold or fold the first display part and the second display part;
   the first display part comprises a first folded face connected to the fold joint, a first outer face connected to the fold joint, a first lateral face connected to the first folded face and the first outer face, and away from the fold joint; wherein the first outer face is configured to display and opposite to the first folded face, a mounting slot is defined at the first folded face and extends to the first lateral face;
   the second display part comprises a second folded face connected to the fold joint, a second outer face connected to the fold joint, a second lateral face connected to the second folded face and the second outer face, and away from the fold joint; wherein the second outer face is configured to display and opposite to the second folded face, an escape hole is defined by the second display part, penetrates the second folded face and the second outer face, and extends to the second lateral face;
   when the fold joint is folded, the first folded face is faced to the second folded face, the mounting slot and the escape hole communicate with each other to form a receiving space, a camera is rotatably connected to a wall of the mounting slot to rotate into or out of the receiving space;
   wherein an orientation of an image-capturing face of the camera coincides with an orientation of the second outer face, when the camera rotates into the receiving space;
   wherein the camera comprises a first outer wall face, an orientation of the first outer wall face coincides with the orientation of the second outer face, when the camera rotates into the receiving space, and the first outer wall face defines a through hole, with the image-capturing face of the camera facing towards the through hole;
   wherein the mobile terminal further comprises a secondary display screen, the secondary display screen is disposed on the first outer wall face, the secondary display screen comprising a light-transmitting region facing towards the through hole.

18. A camera assembly, comprising a first portion, a second portion, and a fold joint, wherein the fold joint is connected between the first portion and the second portion, the fold joint is configured to get unfolded or folded to unfold or fold the first portion and the second portion;
   the first portion comprises a first folded face connected to the fold joint, a first outer face connected to the fold joint, and opposite to the first folded face, a first lateral face connected to the first folded face and the first outer face, and away from the fold joint;
   wherein a mounting slot is defined at the first folded face and extends to the first lateral face;
   the second portion comprises a second folded face connected to the fold joint, a second outer face connected to the fold joint, and opposite to the second folded face, a second lateral face connected to the second folded face and the second outer face, and away from the fold joint; wherein an escape hole is defined by the second portion, penetrates the second folded face and the second outer face, and extends to the second lateral face;
   when the fold joint is folded, the first folded face is faced to the second folded face, the mounting slot and the escape hole communicate with each other to form a receiving space, a camera is rotatably connected to a wall of the mounting slot to rotate into or out of the receiving space;
   wherein an orientation of an image-capturing face of the camera coincides with an orientation of the second outer face, when the camera rotates into the receiving space;
   wherein the camera comprises a first outer wall face, an orientation of the first outer wall face coincides with the orientation of the second outer face, when the camera rotates into the receiving space, and the first outer wall face defines a through hole, with the image-capturing face of the camera facing towards the through hole;

wherein the camera assembly further comprises a secondary display screen, the secondary display screen is disposed on the first outer wall face, the secondary display screen comprising a light-transmitting region facing towards the through hole.

\* \* \* \* \*